(12) United States Patent
Slobodyanskiy et al.

(10) Patent No.: US 11,893,525 B2
(45) Date of Patent: Feb. 6, 2024

(54) DISPATCH ADVISOR TO ASSIST IN SELECTING OPERATING CONDITIONS OF POWER PLANT THAT MAXIMIZES OPERATIONAL REVENUE

(71) Applicant: GENERAL ELECTRIC COMPANY, Schenectady, NY (US)

(72) Inventors: Ilya Alexandrovich Slobodyanskiy, Simpsonville, SC (US); David Leach, Simpsonville, SC (US); Berardino Pezzella, Giussano (IT)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 208 days.

(21) Appl. No.: 17/243,876

(22) Filed: Apr. 29, 2021

(65) Prior Publication Data
US 2022/0358431 A1 Nov. 10, 2022

(51) Int. Cl.
*G06Q 10/06* (2023.01)
*G06Q 10/0631* (2023.01)
(Continued)

(52) U.S. Cl.
CPC ..... *G06Q 10/06313* (2013.01); *G05B 13/042* (2013.01); *G06Q 10/20* (2013.01);
(Continued)

(58) Field of Classification Search
None
See application file for complete search history.

(56) References Cited

U.S. PATENT DOCUMENTS

2004/0021695 A1 * 2/2004 Sauermann ......... G06F 3/04847
715/786
2015/0185716 A1 * 7/2015 Wichmann ................ F02C 9/28
700/287
(Continued)

OTHER PUBLICATIONS

Barigozzi et al. (Techno-economic analysis of gas turbine inlet air cooling for combined cycle power plant for different climatic conditions, Applied Thermal Engineering, vol. 82, 2015, pp. 57-67, ISSN 1359-4311, https://doi.org/10.1016/j.applthermaleng.2015.02.049).*

(Continued)

*Primary Examiner* — Matthew D Henry
(74) *Attorney, Agent, or Firm* — Grogan, Tuccillo & Vanderleeden, LLP

(57) ABSTRACT

A dispatch advisor to assist in selecting operating conditions of a power plant that maximizes operational revenue is described. The dispatch advisor obtains a base load map for operating the power plant to meet base load power demands. The base load map includes a primary base load operating space for attaining target plant power output and efficiency, and an expanded base load portion for attaining higher plant power output and less than optimal efficiency. Both the primary base load operating space and the expanded base load portion associate power output and efficiency values of the power plant that result from a subset of operational parameter values for operating the power plant during base load. The dispatch advisor can transform the flexible base load map into one or more visualizations describing the revenue possibilities associated with operating the power plant based on operating values and attained power output and efficiency.

20 Claims, 16 Drawing Sheets

(51) Int. Cl.
*G05B 13/04* (2006.01)
*G06Q 10/20* (2023.01)
*G06Q 30/018* (2023.01)
*G06Q 40/02* (2023.01)
*G06Q 50/06* (2012.01)
*G06F 3/04847* (2022.01)

(52) U.S. Cl.
CPC ........... *G06Q 30/018* (2013.01); *G06Q 40/02* (2013.01); *G06Q 50/06* (2013.01); *G06F 3/04847* (2013.01)

(56) References Cited

U.S. PATENT DOCUMENTS

2016/0258361 A1* 9/2016 Tiwari .................. G06Q 50/06
2018/0284706 A1* 10/2018 Anubi ................. G05B 19/042
2022/0358431 A1* 11/2022 Slobodyanskiy .... G05B 13/042

OTHER PUBLICATIONS

European Search Report dated Sep. 21, 2022 from corresponding European Application No. 22168140.6-1218.

* cited by examiner

DISPATCH ADVISOR TO ASSIST IN SELECTING OPERATING CONDITIONS OF POWER PLANT THAT MAXIMIZES OPERATIONAL REVENUE

CROSS REFERENCE TO RELATED APPLICATIONS

The present patent application is related to concurrently filed, co-pending, and commonly assigned U.S. patent application Ser. No. 17/243,758, entitled DISPATCH ADVISOR FOR OPERATING POWER PLANT WITH FLEXIBILITY, the disclosure of which is incorporated herein by reference.

BACKGROUND

Technical Field

Embodiments of the invention relate generally to power plants and more particularly, to providing a dispatch advisor to assist in selecting operating conditions of a power plant that maximizes operational revenue.

Discussion of Art

Many power plants such as combined-cycle power plants employ gas turbines as a source of power to satisfy at least part of consumers' overall electrical demand. Plant operators sometimes peak-fire their gas turbines above their base capacity during peak demand periods. Peak-firing gas turbines above their base capacity produces extra power output when needed, but at the expense of faster parts-life consumption (e.g., extra factored fired hours). If gas turbines are peak-fired often within the maintenance interval (or maintenance life), the incremental parts-life consumption may cause the maintenance interval to be shortened. As a result, maintenance schedules are pulled in and extra customer service agreement charges may be incurred. Consideration of these extra maintenance costs, in terms of more frequent servicing of the gas turbines, can lead plant asset owners to exercise peak-fire mode more conservatively than necessary, which may result in missed revenue opportunity.

BRIEF DESCRIPTION

The following presents a simplified summary of the disclosed subject matter in order to provide a basic understanding of some aspects of the various embodiments. This summary is not an extensive overview of the various embodiments. It is not intended to exclusively identify key features or essential features of the claimed subject matter set forth in the Claims, nor is it intended as an aid in determining the scope of the claimed subject matter. Its sole purpose is to present some concepts of the disclosure in a streamlined form as a prelude to the more detailed description that is presented later.

Embodiments are directed to providing solutions that relate to advising operators of power plants utilizing gas turbines such as combined-cycle power plants, on how to select operating conditions that maximize operational revenue, taking into account capacity remuneration mechanisms, instantiations of market conditions, and parts-life consumption and maintenance schedule of components of the power plant. The solutions provided by the various embodiments include using a dispatch advisor to obtain a flexible base load map for operating the power plant to meet base load power demands. The flexible base load map includes a primary base load operating space for attaining target plant power output and efficiency, and an expanded base load portion for attaining higher plant power output and less than optimal efficiency. Both the primary base load operating space and the expanded base load portion associate power output and efficiency values of the power plant that result from a subset of operational parameter values for operating the power plant during base load. The dispatch advisor can transform the flexible base load map into one or more visualizations describing the revenue possibilities associated with operating the power plant based on operating values and attained power output and efficiency that is represented in the flexible base load map.

In one embodiment, these visualizations can include interactive visualizations that allow plant operators to directly manipulate and explore the representations of the data in the visualizations to ascertain a selection of operating conditions that can be used to operate the power plant in a manner that satisfies any of a number of combinations of power plant considerations that can include one or more of ambient, operational, contractual, regulatory, legal, and/or economic and market conditions. To this extent, the interactive visualizations can be utilized to select operating conditions of the power plant that maximize operational revenue. For example, the interactive visualizations provided by the dispatch advisor can be used to select operating conditions of the power plant that maximize operational revenue based on instantiations of market conditions. This can include using the visualizations to sell power in a spot market, while allowing for a highest possible capacity payment for capacity or power commitments entered into over a capacity market. In another embodiment, the interactive visualizations of the dispatch advisor can be used to forecast operational scenarios, manage outages and availability. For example, the interactive visualizations of the dispatch advisor can be used for the process of prospectively purchasing fuel for future generating periods so that fuel inventory is minimized, while not increasing the risk of a shortfall. In another example, the interactive visualizations of the dispatch advisor can be used in the process of prospectively setting a service and maintenance program that determines when to service and/or replace various parts and components of the power plant in a manner that minimizes downtime and availability of the power plant.

In one embodiment, a method for assisting in selecting operating conditions of a power plant having at least one gas turbine that maximizes operational revenue is provided. The method comprises: obtaining, by a system comprising at least one processor, a flexible base load map for operating the power plant to meet base load power demands, wherein the flexible base load map includes a primary base load operating space for attaining target plant power output and efficiency, and an expanded base load portion for attaining higher plant power output and sub-optimal efficiency in relation to the primary base load operating space, both the primary base load operating space and the expanded base load portion including a representation that associates power output and efficiency values of the power plant that result from a subset of operational parameter values for operating the power plant during base load, the operational parameters including firing temperature of the gas turbine, a position of inlet guide vanes in the gas turbine, and fuel temperature of the fuel in the gas turbine; partitioning, by the system, the flexible base load map into a plurality of operating segments, each operating segment including a range of operating values for the operational parameters and corresponding power output and efficiency values that are attained while operating the power plant at the range of operating values in the operating segment; for each of the plurality of operating segments, determining, by the system, revenue that is generated from operating the power plant over the range of operating values that attain the corresponding power output and efficiency values taking into consideration at least one of a plurality of market conditions associated with a power generation market; generating, by the system, a plurality of visualizations of the revenue associated with each of the operating segments in the partitioned flexible base load map for each of the plurality of market conditions, wherein each visualization of the revenue determined for the plurality of market conditions includes a visual representation of the revenue associated with operating the power plant in each of the plurality of operating segments based on the respective range of operating values and power output and efficiency values that are attained with the operating values; and presenting for display, with the system, one or more of the plurality of visualizations of the revenue associated with each of the operating segments in the partitioned flexible base load map for each of the plurality of market conditions.

In another embodiment, a system is provided. The system comprises: a memory that stores executable components; a processor, operatively coupled to the memory, that executes the executable components. The executable components comprising: a dispatch advisor system for assisting in selecting operating conditions of a power plant having at least one gas turbine that maximizes operational revenue, the dispatch advisor system configured to perform the method comprising: obtaining, by the processor, a flexible base load map for operating the power plant to meet base load power demands, wherein the flexible base load map includes a primary base load operating space for attaining target plant power output and efficiency, and an expanded base load portion for attaining higher plant power output and sub-optimal efficiency in relation to the primary base load operating space, both the primary base load operating space and the expanded base load portion including a representation that associates power output and efficiency values of the power plant that result from a subset of operational parameter values for operating the power plant during base load, the operational parameters including firing temperature of the gas turbine, a position of inlet guide vanes in the gas turbine, and fuel temperature of the fuel in the gas turbine; partitioning, by the processor, the flexible base load map into a plurality of operating segments, each operating segment including a range of operating values for the operational parameters and corresponding power output and efficiency values that are attained while operating the power plant at the range of operating values in the operating segment; for each of the plurality of operating segments, determining, by the processor, revenue that is generated from operating the power plant over the range of operating values that attain the corresponding power output and efficiency values taking into consideration at least one of a plurality of market conditions associated with a power generation market; generating, by the processor, a plurality of visualizations of the revenue associated with each of the operating segments in the partitioned flexible base load map for each of the plurality of market conditions, wherein each visualization of the revenue determined for the plurality of market conditions includes a visual representation of the revenue associated with operating the power plant in each of the plurality of operating segments based on the respective range of operating values and power output and efficiency values that are attained with the operating values; and presenting for display, with the processor, one or more of the plurality of visualizations of the revenue associated with each of the operating segments in the partitioned flexible base load map for each of the plurality of market conditions.

In yet another embodiment, a non-transitory computer-readable medium having stored thereon executable instructions that, in response to execution, cause a system comprising at least one processor to perform operations directed to generating a dispatch advisor system for assisting in selecting operating conditions of a power plant having at least one gas turbine that maximizes operational revenue is provided. The operations comprises: obtaining a flexible base load map for operating the power plant to meet base load power demands, wherein the flexible base load map includes a primary base load operating space for attaining target plant power output and efficiency, and an expanded base load portion for attaining higher plant power output and sub-optimal efficiency in relation to the primary base load operating space, both the primary base load operating space and the expanded base load portion including a representation that associates power output and efficiency values of the power plant that result from a subset of operational parameter values for operating the power plant during base load, the operational parameters including firing temperature of the gas turbine, a position of inlet guide vanes in the gas turbine, and fuel temperature of the fuel in the gas turbine; partitioning the flexible base load map into a plurality of operating segments, each operating segment including a range of operating values for the operational parameters and corresponding power output and efficiency values that are attained while operating the power plant at the range of operating values in the operating segment; for each of the plurality of operating segments, determining revenue that is generated from operating the power plant over the range of operating values that attain the corresponding power output and efficiency values taking into consideration at least one of a plurality of market conditions associated with a power generation market; generating a plurality of visualizations of the revenue associated with each of the operating segments in the partitioned flexible base load map for each of the plurality of market conditions, wherein each visualization of the revenue determined for the plurality of market conditions includes a visual representation of the revenue associated with operating the power plant in each of the plurality of operating segments based on the respective range of operating values and power output and efficiency values that are attained with the operating values; and presenting for display one or more of the plurality of visualizations of the revenue associated with each of the operating segments in the partitioned flexible base load map for each of the plurality of market conditions.

DRAWINGS

The present invention will be better understood from reading the following description of non-limiting embodiments, with reference to the attached drawings, wherein below:

DETAILED DESCRIPTION

Figure 1:
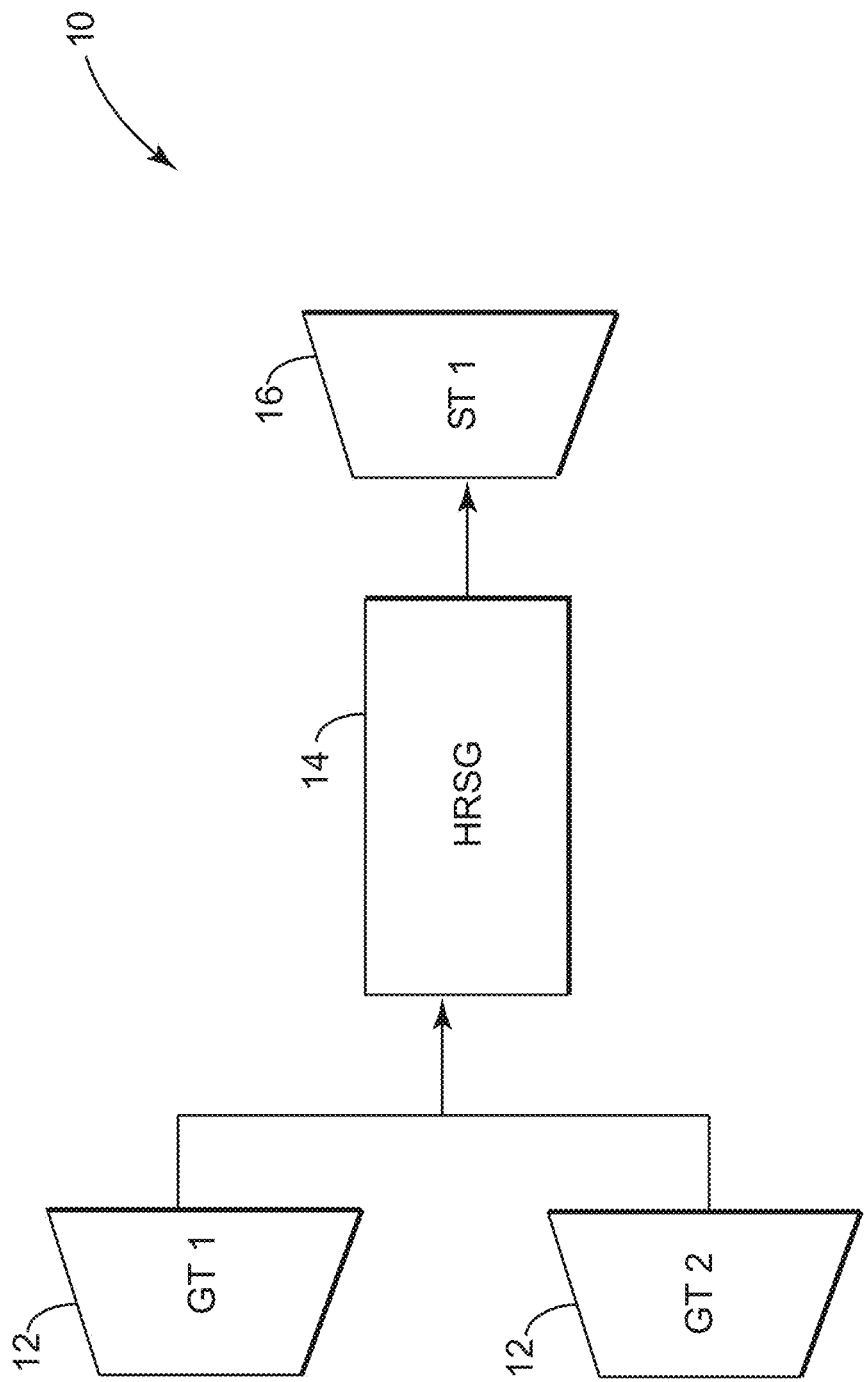
FIG. 1 is a block diagram of an example of a power plant in which embodiments of the present invention are suitable for use in providing guidance on how to manage its operation in a manner that maximizes operational revenue in accordance with an embodiment of the present invention.

Example embodiments of the present invention will be described more fully hereinafter with reference to the accompanying drawings, in which some, but not all embodiments are shown. Indeed, the present invention may be embodied in many different forms and should not be construed as limited to the embodiments set forth herein; rather, these embodiments are provided so that this disclosure will satisfy applicable legal requirements. Like numbers may refer to like elements throughout.

According to aspects of the present invention, systems and methods are disclosed which may be used to optimize the performance of power systems, power plants, and/or thermal power generating units for a given set of design and operating control capabilities. In exemplary embodiments, this optimization can include guidance to an operator of a power plant in selection of optimum operating conditions of the plant. In other embodiments, this optimization can include an economic optimization by which an operator of a power plant decides between alternative modes of operation in order to enhance profitability. These embodiments may be utilized within a particular power system in order to provide a competitive edge in procuring advantageous economic commitment terms during a dispatch process of the power system.

An adviser function associated with the various embodiments may guide the operator of the power plant in the selection of optimum operating conditions of the power plant. To this extent, the adviser function may allow the operator to make choices between operating modes based on accurate economic comparisons and projections. For example, the advisor function can assist an operator in selecting operating conditions of the power plant that maximizes operational revenue. In one embodiment, the advisor function can offer guidance to an operator in selecting operating conditions of the power plant that maximizes operational revenue based on instantiations of market conditions. This can include selling power in a spot market, while allowing for the highest possible capacity payments for capacity or power commitments entered into over a capacity market. The advisor function can also be used to assist in forecasting operational scenarios, manage outages and availability. For example, an operator of a power plant can use the advisor function for the process of prospectively purchasing fuel for future generating periods so that fuel inventory is minimized, while not increasing the risk of a shortfall. In another example, an operator of a power plant can use the advisor function for the process of prospectively setting a service and maintenance program that determines when to service and/or replace various parts and components of the power plant in a manner that minimizes downtime and availability of the power plant.

Technical effects of some configurations of the various embodiments of the present invention include the generation and solution of an energy system representation that advises or provides guidance on optimally operating a power plant under varying physical, operational, and/or economic conditions with as much flexibility as possible. In doing this, an operator of a power plant can select optimum operating conditions of the power plant that maximize profitability for particular power plant considerations. These power plant considerations can include any number of combinations of one or more ambient, operational, contractual, regulatory, legal, and/or economic and market conditions.

Turning now to the figures, FIG. 1 shows a block diagram of an example of a power plant 10 in which embodiments of the present invention are suitable for use in providing guidance on how to manage its operation in accordance with an embodiment of the present invention. The power plant 10 depicted in FIG. 1 is a combined-cycle power plant, and in particular, is an example of 2×1 combined-cycle power plant that comprises two gas turbines 12 (GT 1 and GT 2) a heat recovery steam generator (HRSG) 14, and a steam turbine 16 (ST 1). In general, the gas turbines 12 (GT 1 and GT 2) are heated to a high temperature. The HRSG 14 captures the exhaust gas from the gas turbines 12 (GT 1 and GT 2) to create steam that is delivered to the steam turbine 16 (ST 1).

Both the gas turbines 12 (GT 1 and GT 2) and the steam turbine 16 (ST 1) can drive a generator to produce electricity that is supplied to an electrical power grid. It is understood that this 2×1 combined-cycle power plant configuration is only an example of one combined-cycle power plant in which the various embodiments have utility. While the various embodiments are described with respect to a combined-cycle power plant, these embodiments are suitable for use with other power plants that include at least one gas turbine.

It is understood that the power plant 10 depicted in FIG. 1 is a simplified representation of a combined-cycle power plant, and those skilled in the art will appreciate that the power plant can include other components. For example, the power plant 10 can include a component controller that controls various aspects of parts, components, machines, apparatuses or the like that are operatively coupled with each of the gas turbines 12 (GT 1 and GT 2), the heat recovery steam generator (HRSG) 14, and the steam turbine 16 (ST 1), including, but not limited to, sensors, valves, etc. In addition, the power plant 10 can include a plant controller that receives data and sends or instructs the component controller to facilitate any of a number of operations. It will be appreciated that the component controller and the plant controller may be combined into a single controller. In any event, the plant controller may communicate with a plant operator and any of a number of data resources. According to certain embodiments, the plant controller can issue recommendations to the plant operator regarding desired operating setpoints for the power plant 10. The plant controller can also receive instructions and commands from the plant operator regarding a number of different operations. In addition, the plant controller may receive and store data on the operation of the components and subsystems of the power plant 10. The various embodiments described herein are suitable for use as a functionality that operates as a part of the plant controller.

In a typical combined-cycle power plant, the base load of the power plant at given ambient conditions can be defined by the firing temperature or operating temperature of the gas turbine, and a position of the inlet guide vanes (IGV) in the gas turbine. To this extent, the firing temperature and the IGV position can define an operating point for the combined-cycle power plant with the highest output and efficiency. However, operating the combined-cycle power plant according to a defined operating point has its limitations.

Embodiments of the present invention overcome these limitations associated with operating the combined-cycle power according to an operating point, by defining an operating space of optimum operating conditions for operating the combined-cycle power plant that an operator can use as guidance to select specific settings of operational parameters of the power plant that are represented in the operating space during base load at predetermined ambient conditions. The derivation of the operating space associated with the various embodiments is based on combined-cycle power plants that utilize gas turbines that have an option of partial peak firing. This allows an operator to command a desired output. In some instances, this option makes it possible for the gas turbine to increase the firing temperature (within +35 F range) to achieve a target megawatt (MW) output. At a predetermined compressor inlet temperature (CTIM) (e.g., CTIM<22 C), the IGV position can be defined as an exhaust Mach number (the "Mach number"). On this basis, an operating line for operating the power plant can be defined by the firing temperature and the Mach number. This operating line can be expanded from a line to an operating space that represents the space of operation of the firing temperature and the Mach number of the power plant during base load at predetermined ambient conditions. For example, in one embodiment, the operating space of the power plant can be defined by a variable firing temperature and a constant Mach number. From this operating space, the power plant can be operated to achieve target output and efficiency.

The capability to operate the power plant with variable firing temperature in order to increase output and efficiency is beneficial, however, there are drawbacks in that there is an impact on the life cycle of parts or components of the power plant. For example, an increased firing temperature and exposure time at the increased temperature will adversely impact the life cycle of combustion and hot gas path parts, which can result in maintenance and replacement costs to keep the power plant operational for meeting base load power demands, as well as availability issues due to service. In another scenario, increasing the Mach number can reduce the life of a rotor of the gas turbine, and thus, require maintenance. Since it is expected that as gas turbine technology evolves, the Mach numbers will increase. This will allow for more gas turbine output, and hence, more combined-cycle power plant output, but at a lower efficiency.

In order to accommodate a larger operating space that accounts for variable firing temperatures and Mach numbers, and the effect that variable operational parameters will have on the output and efficiency of the power plant, the various embodiments are directed to improving upon the operating space that can be based on a variable firing temperature and a constant Mach number. For example, the various embodiments are directed to providing an operating space that represents variable firing temperatures and Mach numbers in relation to their effects on the output and efficiency of the power plant. In one example, an operator of a power plant can use the operating space from the various embodiments that contains an expanded representation of the increased firing temperature and Mach number values to adjust target plant load and efficiency. To this extent, an operator can adjust the target plant load and efficiency to accommodate one of a number of business interests that can include, but are not limited to, maximizing revenue, forecasting operational scenarios, managing outages and availability, purchasing fuel, and planning for service and maintenance.

The larger operating space of the various embodiments also takes into account the increased firing temperature and Mach number values that can result in sub-optimal efficiency. As used herein, sub-optimal efficiency means that the power plant runs at less than full power and implies that the capital costs per MW of the output of the plant are higher. In particular, the operating space of the various embodiments is expanded to accommodate another operational parameter that can have an added role in effecting the output and efficiency that results from the increased firing temperature and Mach number values. In one embodiment, this additional operational parameter can include the fuel temperature of the fuel in the gas turbine. With this added operational parameter in the operational space, an operator can use the operational space to select optimum conditions for the firing temperature, Mach number, and the fuel temperature in those instances where it is desired to run at a higher output, but at sub-optimal efficiency. In this manner, the operator can adjust the firing temperature, Mach number and the fuel temperature to accommodate one of a number of business interests that can include, but are not limited to, maximizing revenue, forecasting operational scenarios, managing outages and availability, purchasing fuel, and planning for service and maintenance. For example, in one embodiment, the operator can adjust these parameters to maximize operational revenue based on instantiations of market conditions. This can include selling power in a spot market, while allowing for the highest possible capacity payments for capacity or power commitments entered into over a capacity market. In some instances, this can be of interest to power plant operators even despite the effect that sub-optimal efficiency can have in not yielding the highest revenue due to the impact on parts of the turbine such as combustion, hot gas parts and rotor life. For example, changes to the fuel temperature, such as lowering it, can increase output and lower efficiency, but have no impact on maintenance and availability, and thus, do not adversely affect the operational revenue.

Figure 2:
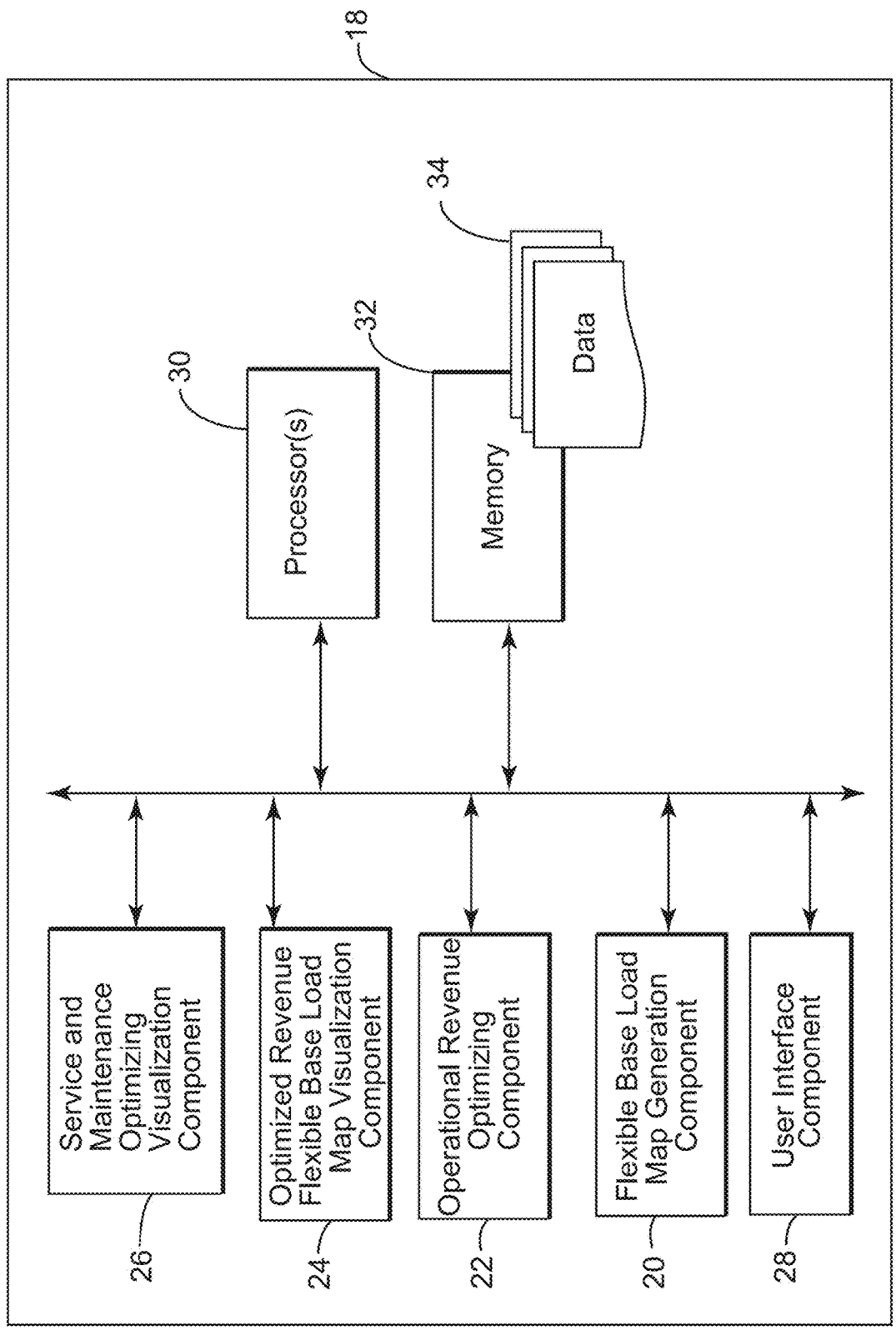
FIG. 2 is a block diagram of an example of a dispatch advisor system for operating a power plant having at least one gas turbine with flexibility in accordance with an embodiment of the present invention.

FIG. 2 is a block diagram of an example of a dispatch advisor system 18 for operating a power plant having at least one gas turbine with flexibility in accordance with an embodiment of the present invention. Aspects of the dispatch advisor system 18 including methods, processes, and operations performed thereby can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Further, the description that follows for the dispatch advisor system 18 in FIG. 2, as well as the description associated with other figures may use the terms "object," "module," "interface," "component," "system," "platform," "engine," "selector," "manager," "unit," "store," "network," "generator" and the like to refer to a computer-related entity or an entity related to, or that is part of, an operational machine or apparatus with a specific functionality. These entities can be either hardware, a combination of hardware and firmware, firmware, a combination of hardware and software, software, or software in execution. In addition, entities identified through the above terms are herein generically referred to as "functional elements." As an example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution, and a component may be localized on one computer and/or distributed between two or more computers. Also, these components can execute from various computer-readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As an example, a component can be an apparatus with specific functionality provided by mechanical parts operated by electric or electronic circuitry, which is operated by software, or firmware application executed by a processor, wherein the processor can be internal or external to the apparatus and executes at least a part of the software or firmware application. As another example, a component can be an apparatus that provides specific functionality through electronic components without mechanical parts. The electronic components can include a processor therein to execute software or firmware that confers at least in part the functionality of the electronic components. Interface(s) can include input/output (I/O) components as well as associated processor(s), application(s), or API (Application Program Interface) component(s). While examples presented hereinabove are directed to a component, the exemplified features or aspects also apply to object, module, interface, system, platform, engine, selector, manager, unit, store, network, and the like.

Referring again to FIG. 2, the dispatch advisor system 18 can include a flexible base load map generation component 20, an operational revenue optimizing component 22, an optimized revenue—flexible base load visualization component 24, a service and maintenance optimizing visualization component 26, a user interface component 28, one or more processors 30, and memory 32 that stores data 34. In various embodiments, one or more of the flexible base load map generation component 20, the operational revenue optimizing component 22, the optimized revenue—flexible base load visualization component 24, the service and maintenance optimizing visualization component 26, the user interface component 28, the one or more processors 30, and the memory 26 can be electrically and/or communicatively coupled to one another to perform one or more of the functions of the dispatch advisor system 18. In some embodiments, one or more of the flexible base load map generation component 20, the operational revenue optimizing component 22, the optimized revenue—flexible base load visualization component 24, the service and maintenance optimizing visualization component 26, and the user interface component 28 can comprise software instructions stored on the memory 32 and executed by processor(s) 30. In addition, the dispatch advisor system 18 may interact with other hardware and/or software components not depicted in FIG. 2. For example, processor(s) 30 may interact with one or more external user interface devices, such as a keyboard, a mouse, a display monitor, a touchscreen, or other such interface devices.

The flexible base load map generation component 20 can be configured to generate or obtain a flexible base load map for operating a power plant having at least one gas turbine to meet base load power demands. The flexible base load map can include an operating space for operating the power plant according to a plurality of operational parameters. In one embodiment, the operational parameters can include the firing temperature of the gas turbine and position of inlet guide vanes in the gas turbine, and the fuel temperature of the fuel in the gas turbine. The flexible base load map can include a primary base load operating space obtained from a first set of the operational parameters that provides power output and efficiency values of the power plant that are attained over an operating space of the first set of operational parameters. In one embodiment, the first set of operational parameters can include the firing temperature and the position of the inlet guide vanes. In general, the primary base load operating space is indicative of a primary operating space to attain target plant power output and efficiency. The flexible base load map can further include an expanded portion that provides an operating space that relates to a second set of the operational parameters of the power plant. In one embodiment, the second set of the operational parameters can include the firing temperature, the position of the inlet guide vanes, and the fuel temperature. In general, the expanded portion of the base load operating space is indicative of a secondary operating space that attains higher plant power output and sub-optimal efficiency in relation to the primary base load operating space.

The flexible base load map generation component 20 can also be configured to partition the flexible base load map into a plurality of operating segments. To this extent, each operating segment corresponds to a particular portion of the operating space that is represented in the flexible base load map. Each segment is characterized by a range of operating values for the operational parameters and corresponding power output and efficiency values that are attained while operating the power plant at the range of operating values in the operating segment.

The operational revenue optimizing component 22 can be configured to determine the revenue that is generated from operating the power plant based on the flexible base load map obtained by the flexible base load map generation component 20. In one embodiment, the operational revenue optimizing component 22 can determine the operational revenue for each of the partitioned operating segments over the entire operating space represented by the flexible base load map. In particular, the operational revenue optimizing component 22 can determine the operational revenue for each of the segments based on the range of operating values in the segments and the corresponding power output and efficiency values that are attained for those operating values, while taking into consideration at least one of a plurality of market conditions associated with a power generation market. The plurality of market conditions can include any of a number of conditions that can affect the revenue generated by a power plant. These market conditions can include, but are not limited to, capacity market pricing, spot market pricing, energy market pricing, the capacity or power output that the power plant provides, the capacity rate, fuel prices, and CO2 taxes. In one embodiment, the operational revenue optimizing component 22 can determine the operational revenue for each of the segments by ascertaining income from capacity payments for capacity or power commitments entered into over a capacity market, and income from power sold at a spot market, and debiting the sum of the total income with the expenses of operating the power plant that include fuel expenses, service and maintenance expenses, and CO2 taxes.

The optimized revenue—flexible base load visualization component 24 can be configured to map the revenue determinations for each of the operating segments with the operating space provided by the flexible base load map in order to provide a visual representation of the operational revenue that is generated for each of the operating segments. The optimized revenue—flexible base load visualization component 24 can generate a visual representation of the revenue for the flexible load map including each of the operating segments for the market conditions that were evaluated. In one embodiment, the plurality of visual representations that can be generated can include interactive visualizations that enable direct manipulation and exploration of representations of data in the visualizations with respect to revenue possibilities from operating the power plant to one more of the plurality of market conditions.

The service and maintenance optimizing visualization component 26 can be configured to generate visualizations that depict the impact that the operating space of the flexible base load map will have on the maintenance and service of parts of the power plant based on the operating conditions associated with each of the operating segments. In one embodiment, the service and maintenance optimizing visualization component 26 can be configured to use the visualizations generated from the optimized revenue—flexible base load visualization component 24 and provide a visual representation that provides an indication that such operating conditions in the revenue transposed flexible base load map will have on the service and maintenance of the various parts and components in the power plant. For example, the service and maintenance optimizing visualization component 26 can determine and note that certain higher firing temperatures, although helpful in increasing power output, will come at a price to the service and maintenance of the power plant because such high temperatures will reduce the life cycle of parts, and require maintenance costs to keep running and eventual replacement costs. As a result, the service and maintenance optimizing visualization component 26 can provide indications of other operating segments that will have less impact on service and maintenance, and overall better operational revenue.

The user interface component 28 can be configured to receive user input and to render output to the user in any suitable format (e.g., visual, audio, tactile, etc.). In some embodiments, the user interface component 28 can be configured to generate a graphical user interface that can be rendered on a client device that communicatively interfaces with the dispatch advisor system 18, or on a native display component of the system 18 (e.g., a display monitor or screen). Input data can include, for example, base load data related to the operational parameters of the power plant during base load at a plurality of base load settings at predetermined ambient conditions. As noted above, in one embodiment, the operational parameters can include the firing temperature of the gas turbine, the position of the inlet guide vanes in the gas turbine, and the fuel temperature of the fuel in the gas turbine. In addition to the base load settings of these operational parameters, the input data can include the power output and efficiency values that are attained by the power plant while operating at each of the base load settings at the predetermined ambient conditions during base load. It is understood that the input data can include other data related to other operational parameters. Moreover, it is understood that although the various embodiments are described with respect to parameters that include the firing temperature, the position of the inlet guide vanes, and the fuel temperature, other operational parameters such as temperature, pressure, humidity and gas flow characteristics at locations defined along the path of the working fluid, as well as ambient conditions, fuel characteristics, and other measurables can be used to generate the flexible base load map. In addition to the aforementioned data, the input data can include, for example, user-defined constraints to be taken into account when generating the flexible base load map (e.g., upper and lower limits on gas turbine operating temperature or power output, definition of a desired operating horizon, definition of ambient conditions, identification of days during which the gas turbines are not allowed to run, etc.).

In addition, the input data can include market data such as spot market pricing, capacity market pricing, and energy market pricing. Other input data can include operating expenses that include but are not limited to, fuel pricing, service and maintenance costs of power plant components and parts including replacement costs, and taxes and fees such as CO2 penalties.

The output data that can be rendered by the user interface component 28 can include, but are not limited to, graphical renderings of one or more representations of the flexible base load map for operating the power plant that is generated by the flexible base load map generation component 20. As noted above, these visualizations can include representations pertaining to the operational revenue associated with the generated flexible base load map, and representations pertaining to the service and maintenance of the power plant. Other output data that can be provided by the user interface component 22 can include, for example, text-based or graphical renderings of a plant asset operating profile or schedule. It is understood that both the input data and the output data can be stored in memory 32 as part of the stored data 34.

The one or more processors 30 can perform one or more of the functions described herein with reference to the systems and/or methods disclosed. The memory 32 can be a computer-readable storage medium that can store computer-executable instructions and/or information for performing the functions described herein with reference to the systems and/or methods disclosed.

Additional details of the flexible base load map generation component 20, the operational revenue optimizing component 22, the optimized revenue—flexible base load visualization component 24, and the service and maintenance optimizing visualization component 26, the user interface component 28, the one or more processors 30, memory 32, and the stored data 34 are presented below.

Although features of the dispatch advisor system 18 are described herein with reference to gas turbines, it is to be appreciated that embodiments of the dispatch advisor system 18 are not limited to use solely with gas turbines, but rather can be used to generate a flexible base load map having an extended operating space, maximize operational revenue, forecast operational scenarios, manage outages and availability while achieving maximum revenue, that is suitable for other types of power-generating assets.

Figure 3:
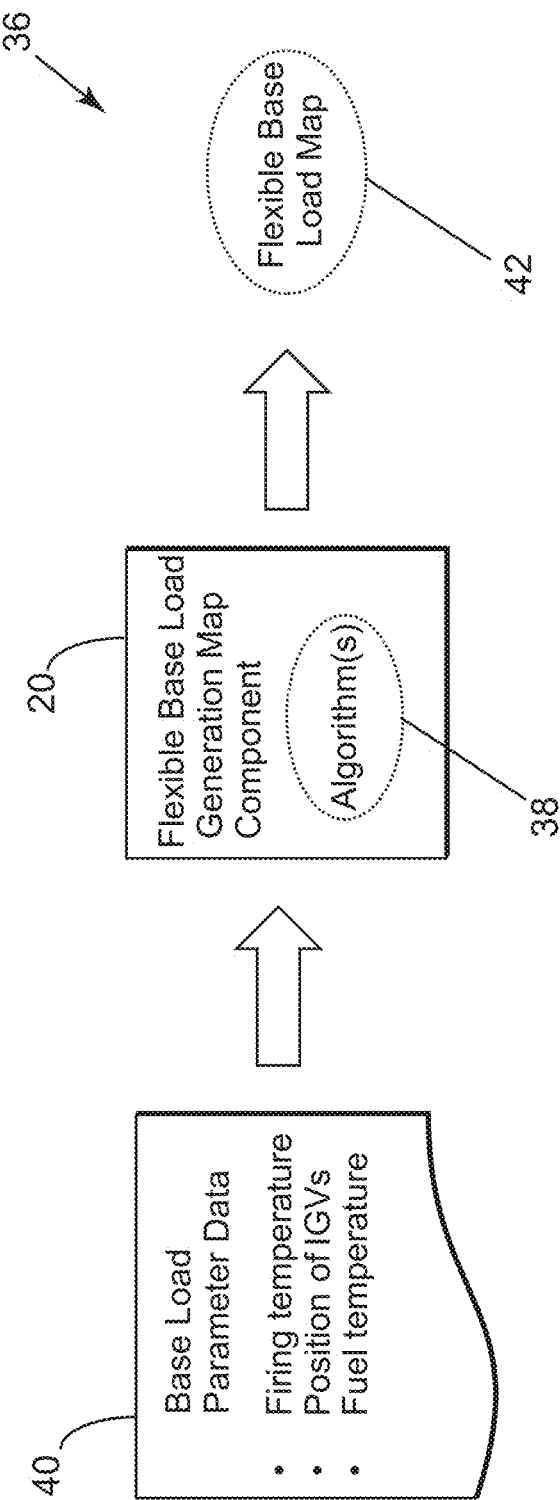
FIG. 3 is a block diagram illustrating example data inputs and outputs for the flexible base load generation component of the dispatch advisor system depicted in FIG. 2 in accordance with an embodiment of the present invention.

FIG. 3 is a block diagram 36 illustrating example data inputs and outputs for the flexible base load generation component 20 of the dispatch advisor system 18 depicted in FIG. 2 in accordance with an embodiment of the present invention. More particularly, the block diagram of FIG. 3 illustrates that the flexible base load generation component 20 is configured to utilize one or more algorithms 38 for operating on base load parameter data 40 to generate a flexible base load map 42. Although the description that follows is directed towards the generation a flexible base load map 42, the flexible base load generation component 20 of the dispatch advisor system 18 described herein can obtain a previously generated flexible base load map 42.

The base load parameter data 40 can include, for example, base load data related to the operational parameters of the power plant during base load at a plurality of base load settings at predetermined ambient conditions. As noted above, in one embodiment, the operational parameters can include the firing temperature of the gas turbine, the position of the inlet guide vanes in the gas turbine, and the fuel temperature of the fuel in the gas turbine. In addition to the base load settings of these operational parameters, the base load parameter data 40 can include the power output and efficiency values that are attained by the power plant while operating at each of the base load settings at the predetermined ambient conditions. With the base load parameter data 40, the algorithm(s) 38 of the flexible base load generation component 20 can generate the flexible base load map 42. Further details of the algorithm(s) 38 and the flexible base load map 42 are discussed below with reference to FIGS. 4 and 5, respectively.

Figure 4:
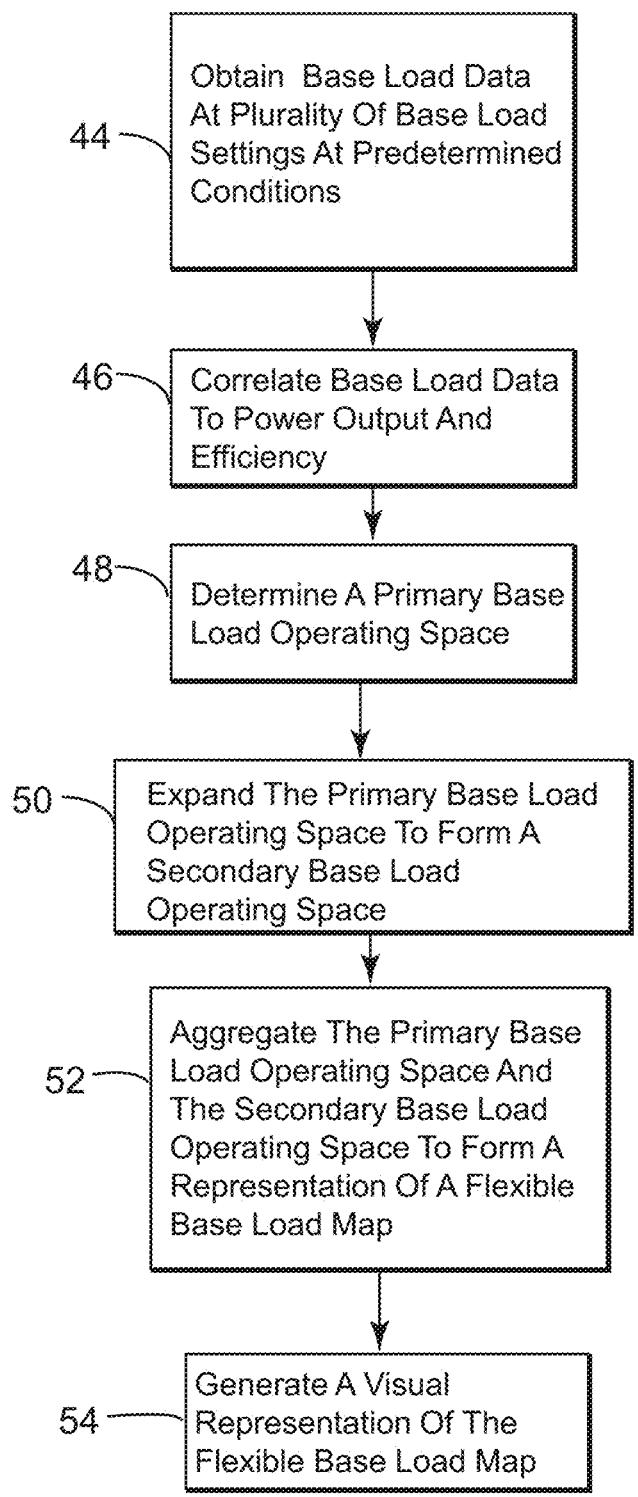
FIG. 4 is flow chart describing examples of operations of an algorithm associated with the flexible base load generation component that can generate a flexible base load map in accordance with an embodiment of the present invention.

As shown in FIG. 4, the algorithm 38 to generate the flexible base load map 42 begins at 44 where a plurality of base load data related to operational parameters of the power plant during base load, at a plurality of base load settings, at predetermined ambient conditions, are obtained. In one embodiment, the operational parameters for which the base load data is obtained can include, but are not limited to, the firing temperature of the gas turbine, the position of inlet guide vanes in the gas turbine, and the fuel temperature of the fuel in the gas turbine.

The obtaining of the base load data can include receiving, gathering or acquiring the data using any of a number of well-known approaches. In one embodiment, the base load data can reside in data libraries, resources and repositories, which may be referred to herein generally as "data resources" that are connected to the dispatch advisor system 18, and in particular, the flexible base load map generation component 20 via communications lines or over which data is exchanged in this embodiment and others disclosed herein. The data resources may include several types of data, including but not limited to, operating data relating to the operational parameters, and ambient data. The ambient data can include information related to ambient conditions at the plant, such as ambient air temperature, humidity, and/or pressure. The operating, and ambient data each may include historical records, present condition data, and/or data relating to forecasts. For example, data resources may include present and forecast meteorological/climate information, present and forecast market conditions, usage and performance history records about the operation of the power plant, and/or measured, observed, or tracked parameters regarding the operation of other power plants having similar components and/or configurations, as well as other data as may be appropriate and/or desired. The communications lines may be wired or wireless, and further, it will be appreciated that the data resources and the dispatch advisor system 18 may be connected to or be part of a larger communications system or network, such as the internet or a private computer network.

The algorithm of FIG. 4 continues at 46 where the base load data is correlated to power output and efficiency values. In one embodiment, the base load data for the operational parameters at each of the plurality of base load settings at the predetermined ambient conditions during base load are correlated to the power output and efficiency values that are attained by the power plant for each of the respective values. To this extent, the flexible base load map generation component 20 can ascertain the power output and efficiency values that are attained by the power plant for each of the values of the operational parameters at each of base load settings.

With this correlation of data, the algorithm run by the flexible base load map generation component 20 can determine a primary base load operating space at 48. In one embodiment, this primary base load operating space is indicative of a primary operating space that enables the power plant to attain target plant power output and efficiency. To this extent, a plant operator can use the primary base load operating space to operate a power plant during base load in a manner that achieves a target output and efficiency.

In one embodiment, the primary base load operating space can be determined from a first set of the operational parameters used in the correlation of the data. To this extent, the primary the base load operating space provides a representation that associates the power output and efficiency values of the power plant that are attained with the first set of operational parameters while operating at each of the plurality of base load settings at the predetermined ambient conditions during base load. In one embodiment, the first set of operational parameters can include the firing temperature and the position of the inlet guide vanes.

After determining the primary base load operating space, a secondary base load operating space can be formed at 50 by expanding upon the primary base load operating space. The secondary base load operating space can be formed from a second set of the operational parameters used in the correlation of the data. For example, the second set of the operational parameters can include the firing temperature, the position of the inlet guide vanes, and the fuel temperature. In one embodiment, the secondary base load operating space is representative of an expanded portion of the primary base load operating space that attains higher plant power output and less than optimal or sub-optimal efficiency in relation to the primary base load operating space. To this extent, a plant operator can use the secondary base load operating space to operate a power plant during base load to achieve different targets in scenarios where it may not be desirable to operate the plant at a high output and efficiency. For example, a plant operator can use the secondary base load operating space to maximize capacity payments for capacity or power commitments entered into over a capacity market at an expense of yielding maximum revenue due to lower efficiency and impact on service life of components of the power plant.

The operations of the algorithm 38 of the flexible base load map generation component 20 can continue at 52 where the primary base load operating space and the secondary base load operating space are aggregated to form a flexible base load map for operating the power plant. In one embodiment, the representation of the flexible base load map offers a range of operating values for the operational parameters and corresponding power output and efficiency values that are attained while operating the power plant at the range of operating values. With this representation containing both the primary base load operating space and the secondary base load operating space, the resulting flexible base load map offers an operator of a power plant with flexibility in controlling the power plant during base load. In particular, the resulting representation provides a first operating space (i.e., the primary base load operating space) that the operator can use to attain target plant power output and efficiency, and a second operating space that attains higher plant power output and less than optimal or sub-optimal efficiency in relation to the first operating space, which offer the operator the option to control the plant in accordance with other objectives that are not concerned with high output and high efficiency (e.g., to maximize capacity payments). This aggregation of the primary base load operating space and the secondary base load operating space can be presented to a plant operator at 54 in the form of a visual representation such as a flexible base load map, of which an example is depicted in FIG. 5.

Figure 5:
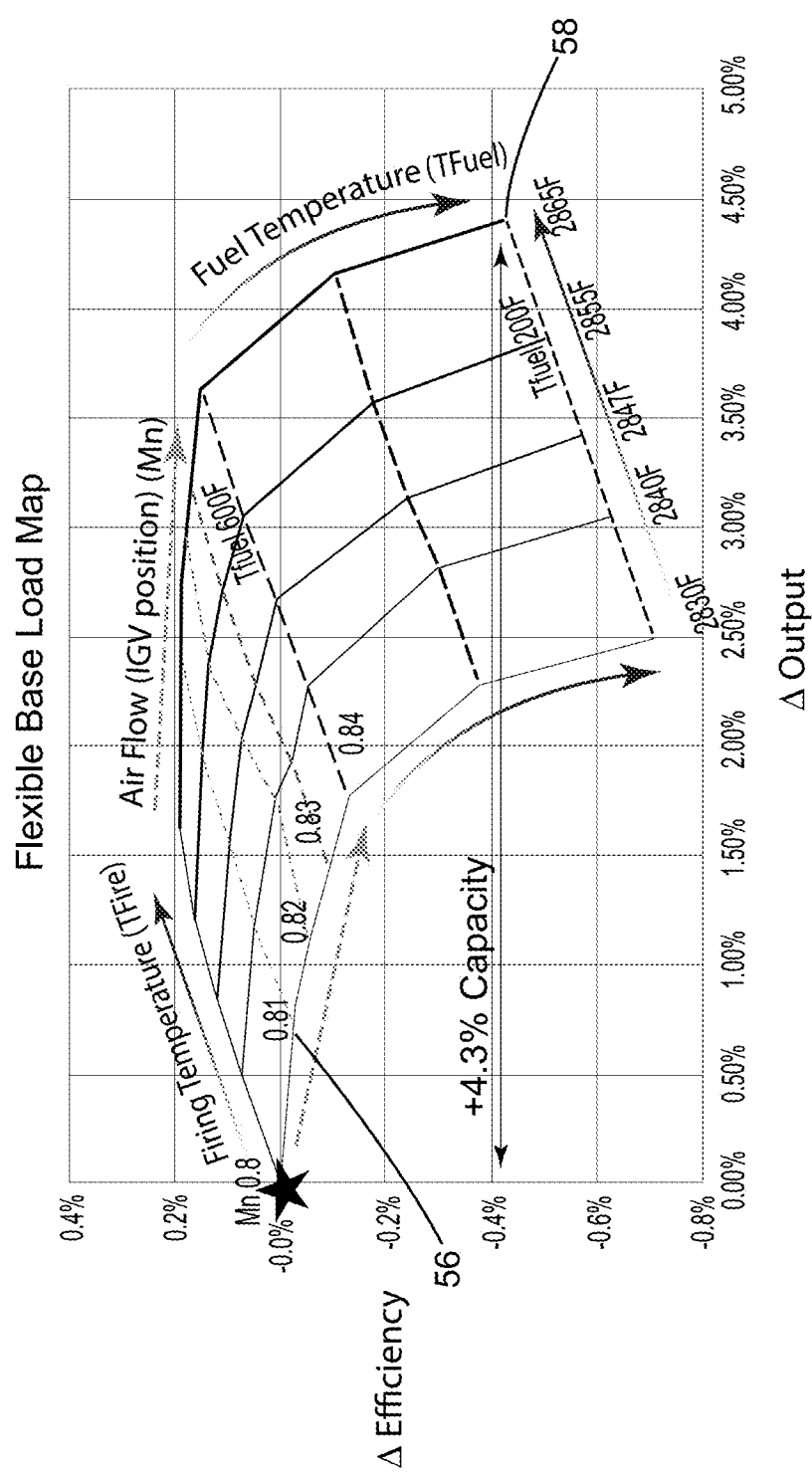
FIG. 5 is an example of a representation of a flexible base load map for operating a power plant that can be generated by the flexible base load generation component using the operations depicted in FIG. 4 in accordance with an embodiment of the present invention.

FIG. 5 is an example of a representation of a flexible base load map 42 for operating the power plant that can be generated by the flexible base load generation component 20 of the dispatch advisor system 18 using the operations depicted in FIG. 4 in accordance with an embodiment of the present invention. FIG. 5 shows the flexible base load map 42 with an operating space defined by operational parameters which can include the firing temperature (TFire) of the gas turbine, the Mach number (Mn) which corresponds to the IGVs position in the gas turbine, and the fuel temperature (TFuel) of the fuel in the gas turbine. As shown in FIG. 5, the flexible base load map 42 can comprise a multi-dimensional representation of these operational parameters. In particular, the multi-dimensional representation of the flexible base load map 42 in FIG. 5 differentiates a primary base load operating space 56 from the expanded portion 58 of the base load operating space which is representative of the secondary base load operating space. FIG. 5 shows that the multi-dimensional representation of the flexible base load map 42 comprises a three-dimensional representation of the operational parameters (e.g., TFire, Mn, and TFuel) and a two-dimensional representation of the power output and efficiency values, which are denoted as A Output and A Efficiency, respectively. In one embodiment, the three-dimensional representation of the operational parameters TFire, Mn, and TFuel is juxtaposed with the two-dimensional representation of the power output and efficiency values A Output and A Efficiency. As shown in FIG. 5, the three-dimensional representation of the operational parameters in the flexible base load map 42 comprises a first axis representative of values associated with the firing temperature TFire, a second axis representative of values associated with the position of the inlet guide vanes Mn, and a third axis representative of values associated with the fuel temperature TFuel, whereas the two-dimensional representation of the power output and efficiency values comprises a first axis representative of the power output values, A Output, and a second axis representative of the efficiency values, A Efficiency.

In the example depicted in FIG. 5, the flexible base load map 42 shows that the firing temperature TFire, the Mach number Mn, and the fuel temperature TFuel are variable in this base load operating space which covers the primary base load operating space 56 and the expanded portion 58. As shown in FIG. 5, the firing temperature TFire can range from 2830 F to 2865 F, while the Mach number Mn ranges from 0.8 to 0.84, and the fuel temperature TFuel can range from 600 F in the region where the primary base load operating space 56 adjoins with the expanded portion 58 containing the secondary base load operating space to 200 F at the region furthest away from the adjoining section.

With this flexible base load map 42 showing an operating space of optimum operating conditions for operating a power plant such as, for example, a combined-cycle power plant, a plant operator can use the operating space as guidance to select specific settings of operational parameters of the power plant during base load at predetermined ambient conditions. To this extent, depending on the desired objectives of how the power plant is to be operated, the plant operator can select values for the firing temperature TFire, the Mach number Mn, and the fuel temperature TFuel that will result in the type power output and efficiency that meets these objectives. For example, if the plant operator desires to operate the power plant to achieve target output and efficiency, the operator could focus on using the operating space in the flexible base load map 42 that is covered by the primary base load operating space 56. To this extent, the operator can use the increased operating space of firing temperature TFire and the Mach number Mn, which extends from 2830 F to 2865 F and from 0.8 to 0.84, respectively, to adjust TFire and Mn values in a manner that achieve a target output and efficiency while satisfying a particular objective or interest. This can include adjusting the target plant load and efficiency to accommodate scenarios where it is desirable to maximize revenue, forecast operational scenarios, manage outages and availability, purchase fuel, and plan for service and maintenance.

In another example of use of the flexible base load map 42 depicted in FIG. 5, the plant operator can use the expanded portion 58 of the base load operating space that is indicative of the secondary base load operating space to select optimum conditions for the firing temperature TFire, Mach number Mn and the fuel temperature TFuel, in those instances where it is desired to run at a higher output, but at sub-optimal efficiency. For example, a plant operator could choose to operate the power plant at a firing temperature TFire of 2865 F, a Mach number Mn of 0.84, and a fuel temperature TFuel of 200 F. In this scenario, as noted in FIG. 5, the output of the power plant would have increased such that there is a 4.3% increase in capacity in comparison to the point depicted in the figure with the star that operates at a firing temperature TFire of 2830 F and a Mach number Mn of 0.8. However, this increased output would come at a decrease in efficiency of the power plant. Such operating scenarios where operating at an increased output, but at a sub-optimal efficiency, may be desirable in certain instances. These instances could arise in circumstances that can include, but are not limited to, maximizing revenue, forecasting operational scenarios, managing outages and availability, purchasing fuel, and planning for service and maintenance. For example, in one embodiment, the operator can adjust the firing temperature TFire, the Mach number Mn, and the fuel temperature TFuel values in the secondary base load space in a manner where output and efficiency are not the primary objectives. In one embodiment, the plant operator can adjust the firing temperature TFire, the Mach number Mn, and the fuel temperature TFuel values in the secondary base load space of the flexible base load map 40 to maximize operational revenue in a spot market by selling power that allows for the highest possible capacity payments. In some instances, this can be of interest to power plant operators even despite the effect that there will be sub-optimal efficiency.

Figure 6:
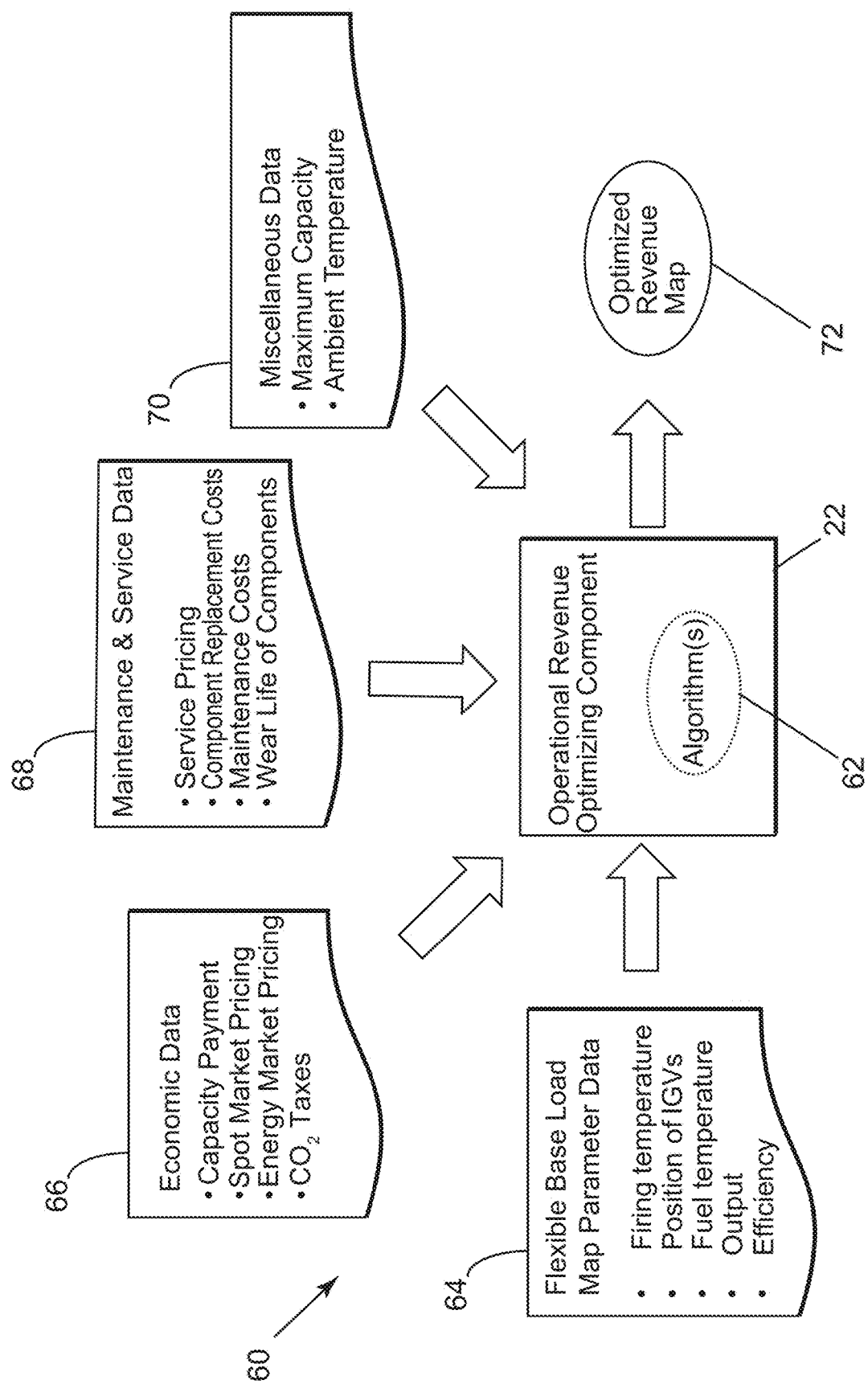
FIG. 6 is a block diagram illustrating example data inputs and outputs for the operational revenue optimizing component of the dispatch advisor system depicted in FIG. 2 in accordance with an embodiment of the present invention.

FIG. 6 is a block diagram 60 illustrating example data inputs and outputs for the operational revenue optimizing component 22 of the dispatch advisor system 18 depicted in FIG. 2 in accordance with an embodiment of the present invention. More particularly, the block diagram of FIG. 6 illustrates that the operational revenue optimizing component 22 is configured to utilize one or more algorithms 62 for operating on flexible base load map parameter data 64, economic data 66, maintenance and service data 68, and miscellaneous data 70 to generate an optimized revenue map 72 for each of the operating segments represented in the flexible base load parameter map data 64.

The flexible base load map parameter data 64 can include, for example, base load data related to the operational parameters of the power plant during base load at a plurality of base load settings at predetermined ambient conditions. This includes the base load for the operational parameters such as the firing temperature of the gas turbine, the position of the inlet guide vanes in the gas turbine, and the fuel temperature of the fuel in the gas turbine. In addition to the base load settings of these operational parameters, the flexible base load map parameter data 64 can include the power output and efficiency values that are attained by the power plant while operating at each of the base load settings at the predetermined ambient conditions during base load. In addition, the flexible base load map parameter data 64 includes the partitioned operating segments and their corresponding operational parameter, power output and efficiency values.

The economic data 66 can include data related to market conditions associated with a power generation market that can affect the revenue generated by a power plant. The data can include, but not limited to, capacity market pricing, spot market pricing, energy market pricing, the capacity or power output that the power plant provides, the capacity rate, fuel prices, and CO2 taxes.

The maintenance and service data 68 can include data related to the maintenance and service of a power plant. This can include data such as service and maintenance costs of power plant components and parts including replacement costs. The maintenance and service data 68 can include historical costs as well as expected costs that are associated with running a power plant at any of the various operational settings for the operational parameters (e.g., firing temperature, IGV positions, fuel temperature). Other maintenance and service data 68 can include the life cycle or wear life of the components that is expected with running a power plant at any of the various operational settings for the operational parameters (e.g., firing temperature, IGV positions, fuel temperature).

The miscellaneous data 70 can include data that relates to the operation of a power plant and that may have a role in impacting the revenue that is generated by the power plant. For example, the miscellaneous data 70 can include ambient temperature data such as climate changes that can constrain power supply, transmission capacity, and demand. The ambient temperature data in the miscellaneous data 70 can include historical data and forecasted data, as well as information that indicates the effects that the temperature has had on power supply, transmission capacity, demand, and revenue. Other miscellaneous data 70 can include data that pertain to individual power plants. For example, this can include the maximum capacity of the power plants, the heat rates of the power plants, component configuration of the power plants, and the like.

Below is a further description of some of the data described above that can be stored in the economic data 66, the maintenance and service data 68, and the miscellaneous data 70 depicted in FIG. 6, and how the data can be obtained. It is understood that the descriptions of the data are illustrative and not meant to be limiting as those skilled in the art will appreciate that other options for obtaining, producing or deriving the data exist.

The power output of a power plant such as a combined-cycle power plant output can be obtained thru simulation of a power plant using a simulation software application such as EBSILON. In one embodiment, the simulation can be carried out across an ambient range, where the flexible base load is provided. In this example, it is reasonable to assume 2 C for ambient steps increments. Those skilled in the art will appreciate that linear interpolation between ambient can be used.

The power plant heat rate of a plant such as a combined-cycle power plant can be obtained from the same simulations used to simulate the performance of the plant including its power output noted above. Linear interpolation is suggested across ambient. It is understood that it is possible to incorporate the effect of degradation, as there are several scenarios of how it can be done.

The maximum capacity (MW) and capacity payment ($/kw-yr) data can be both obtained as values inputted by a plant operator. Although maximum capacity and capacity payments are not expected to change instantaneously, it is understood that in some applications it may be subject for year-to year or seasonal variation and can be adjusted by an operator as appropriate.

Spot market instantaneous power price ($/MW-hr) data is another type of data that can be inputted by the operator.

Fuel price ($/MMBTU (HHV) data is another type of data that can be inputted by the operator.

The instantaneous $CO_2$ tax rate ($/ton) data is another type of data that can be inputted by the operator. In general, the $CO_2$ tax is subject to local and industry regulations. It is expected to vary widely based on location, power demand and other factors. In one embodiment, the $CO_2$ tax rate can be calculated based on the following equation:

$$\frac{CC \text{ output (kW)} * CC \text{ Heat Rate } \frac{kJ}{kWh} * 56.1}{1000000000} * CO2 \text{ tax rate}\left(\frac{\$}{\text{ton}}\right),$$

wherein 56.1 $tonCO_2/TJ$ is a $CO_2$ emissions factor for natural gas per ACER regulation.

It is understood that the service pricing can be based on a multiple of factors. For example, the service pricing can be noted at different levels of overfire over the duration of a customer service agreement (CSA) that a power plant may have. In one embodiment, the service pricing numbers can be obtained by modeling specific service contracts using a modeling software package like MINI, assuming overfire a maintenance factor (MF) applies thru the entire duration of the contract. To this extent, a per hour rate ($/hr) can be derived based on contract duration. This number can represent an effect of overfire on combustion and hot gas path hardware. For example, a cost of 2MI (128,000 AFH) CSA contract with MF=1 (no overfire) is $61,977,773/128,000 AFH, results in a 483.94 $/hr A cost of a 2-MI (128,000 AFH) contract with peak firing at 2865 F (MF=2.23) is $149,838,286. Therefore, an hourly rate of 1170.6 $/hr can be obtained. As a result, these numbers can become a base cost for different levels of overfire.

Replacement costs of components and their maintenance factors such as for example, a rotor replacement can be based on compressor discharge temperature (Tcd) and exposure time. In one embodiment, rotor replacement cost is a constant that can be obtained from a CSA regional team. It is understood that when IGVs are moved to a more open position (high Mn), the compressor discharge temperature (Tcd) increases. Increases in Tcd above certain point, triggers rotor life malfunction MF. In one embodiment, a rotor MF can be estimated based on the Tcd range:

850 F<Tcd<950 F: MF=(0.0007395 $Tcd^2$–0.7316 Tcd+ 0.0002742)/(Tcd–958.6)

Tcd<850 F: MF=0.8.

As an example, the expected rotor replacement life can be determined as 160,000 hrs and its cost is $8,222,369.60. In this example, a rotor MF=1.14 for Mn=0.84. Thus, per hour rotor life impact can be described by the following expression:

$$\frac{\$8,222,369.60}{160,000 \, hr} * 1.14 = 58.58 \, \$/hr.$$

As a result, the total services impact of operation in a particular operating segment of the flexible base load can be a sum of hourly rates for base CSA cost for an overfire scenario and hourly rate of rotor life impact.

The ambient conditions data, which can be used for performance correction of the power plant, can be fed or obtained from databases through typical data retrieval techniques or inputted by the operator.

With the flexible base load map parameter data 64, the economic data 66, the maintenance and service data 68, and the miscellaneous data 70, the algorithm(s) 62 of the operational revenue optimizing component 22 can generate the optimized revenue 72 for each of operating segments represented in the flexible base load parameter map data 64.

Figure 7:
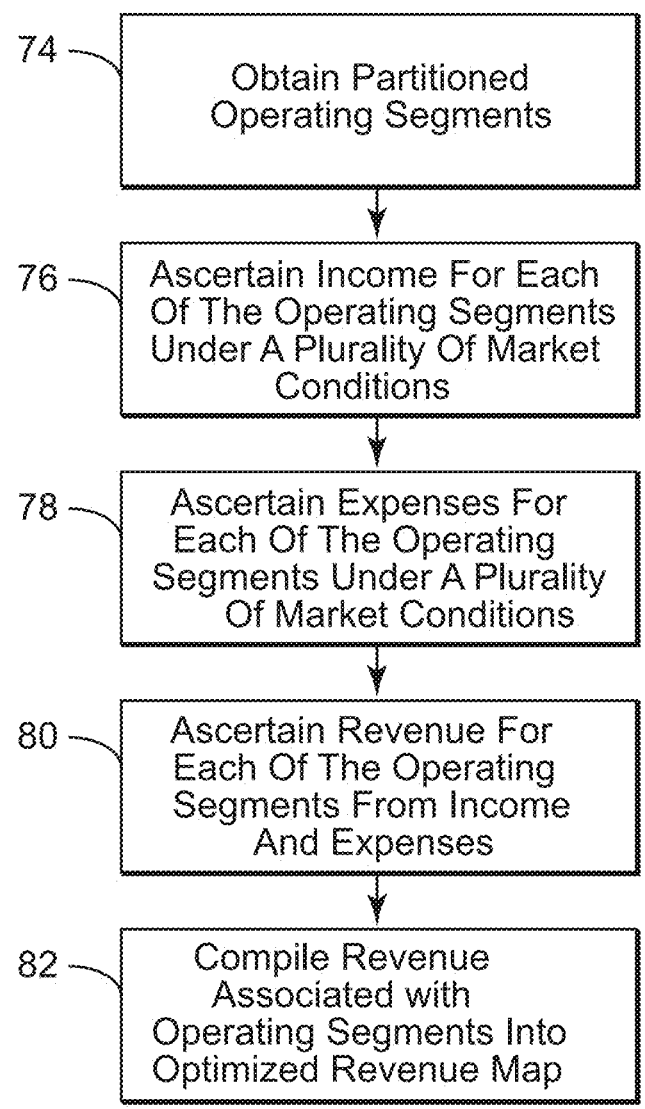
FIG. 7 is flow chart describing examples of operations of an algorithm associated with the operational revenue optimizing component in accordance with an embodiment of the present invention.

Further details of the algorithm(s) 62 and the operational revenue optimizing component 22 are discussed now with reference to FIG. 7. As shown in FIG. 7, the algorithm 62 for optimizing operational revenue begins at 74 where the partitioned operating segments generated by the flexible base load map generation component 20 are obtained. For each of the of operating segments, the income that is earned from operating the power plant over the range of operating values with the corresponding power output and efficiency values is ascertained at 76 for a plurality of market conditions. In one embodiment, the income that can be ascertained includes capacity payments, spot market pricing and energy market pricing. It is understood that capacity payments, spot market pricing and energy market pricing are analogous to specific market conditions, however, embodiments are not meant to be limiting as there other market conditions that can affect the revenue, and thus, the income of the power plant, can include the capacity or power output that the power plant provides, the capacity rate, fuel prices, and CO2 taxes.

In addition to determining the income, the expenses of operating the power plant over each of the operating segments can be ascertained at 78. The expenses can comprise one or more of fuel expenses associated with purchasing fuel for operating the power plant, carbon taxes for emissions created from use of fossil fuels for power generation, and service expenses associated with servicing and maintenance of the power plant. The algorithm 62 can obtain maintenance and service data and economic data such as that described and depicted with respect to FIG. 6.

With the income and expenses ascertained the revenue for each of the operating segments can be determined at 80. In general, the revenue over each of the plurality of operating segments can be determined by debiting a sum of the income from the capacity payments, the income from power sold at a spot market and the income power sold in the energy market with the expenses of operating the power plant in the segments. In one embodiment, revenue can be determined in accordance with the following equation:

$R=(CI+PI)-FE+CO_2 \text{ Tax}+SE)$, wherein

R is revenue from operations;
CI is income from capacity payments;
PI is income from power sold at a spot market;
FE is expenses associated with purchasing fuel;
$CO_2$ Tax is the $CO_2$ tax rate that may be levied by a regulatory authority; and
SE is expenses associated with service and maintenance.

It is understood that this revenue equation represents only one example demonstrating how revenue can be determined. It is not meant to be limiting, as those skilled in the art will appreciate that there are many equations that can be used to determine revenue. In addition, it is understood that the parameters used in the above revenue equation to calculate revenue represent an example of some parameters that can be used, and is not meant to be limiting to the various embodiment. Those skilled in the art will appreciate that the parameters can depend on the type of income that is earned by the power plant and the specific expenses that are incurred while running the plant.

Once the revenue has been ascertained for all of the operating segments, the revenue associated with the segments are compiled into an optimized revenue map at 82. In an embodiment, the optimized revenue map can include the flexible base load map partitioned into operating segments, with each segment containing a range of values for the operational parameters and the corresponding efficiency and output values that are attained with the values of the parameters, and data containing a measurement of the operational revenue that can be earned over a multiple of different market conditions.

Figure 8:
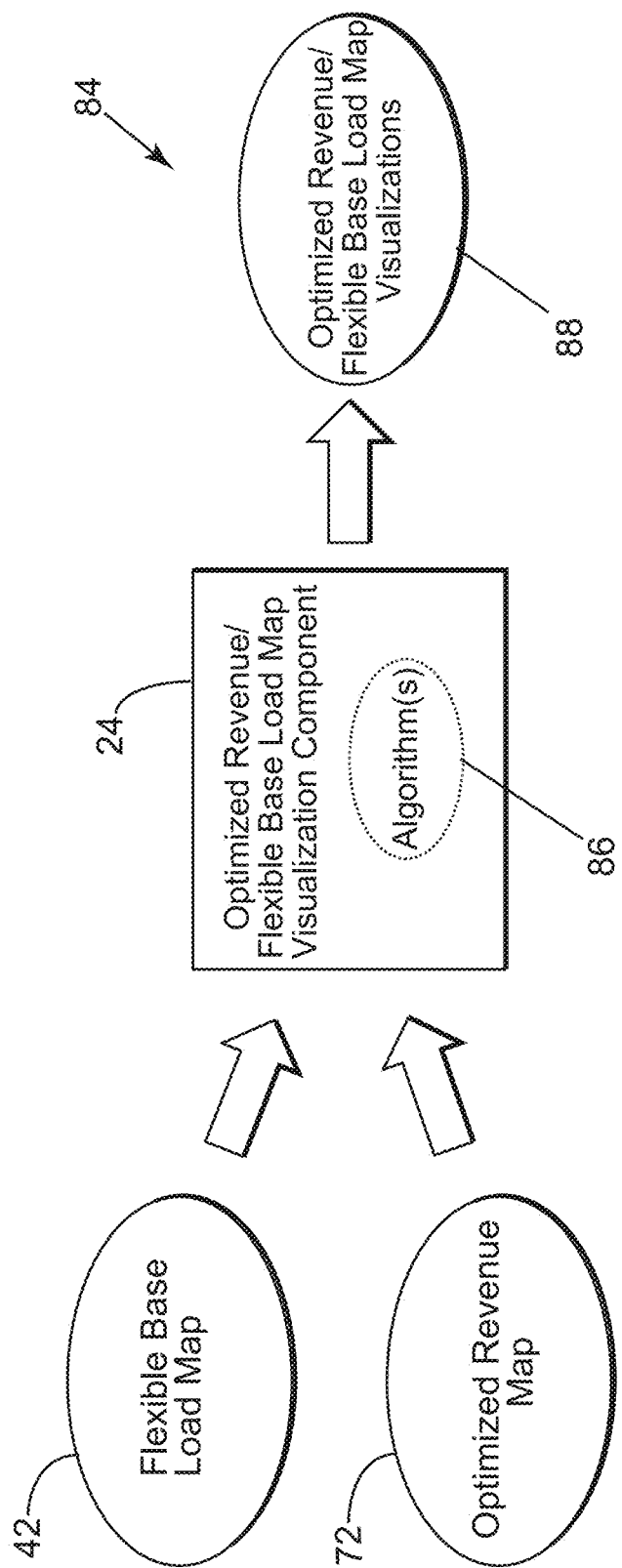
FIG. 8 is a block diagram illustrating example data inputs and outputs for the optimized revenue/flexible base load map visualization component of the dispatch advisor system depicted in FIG. 2 in accordance with an embodiment of the present invention.

FIG. 8 is a block diagram 84 illustrating example data inputs and outputs for the optimized revenue/flexible base load map visualization component 24 of the dispatch advisor system depicted in FIG. 2 in accordance with an embodiment of the present invention. More particularly, the block diagram 84 of FIG. 8 illustrates that the optimized revenue/flexible base load map visualization component 24 is configured to utilize one or more algorithms 86 for operating on the flexible base load map 42 generated by the flexible base load generation component 20 and the optimized revenue map 72 generated by the operational revenue optimizing component 22, to generate a visualization of the revenue determinations for each of the operating segments with the operating space provided by the flexible base load map in order to provide optimized revenue/flexible base load map visualizations 88. In general, the algorithm 86 maps the optimized revenue map 72 within the operating space of the flexible base load map 42, and generates a visual representation for each of the evaluated market conditions. To this extent, each visualization for a particular market condition can include a representation of not only the operating segments of the flexible base load operating space with operational parameters with corresponding output and efficiency, but also the operational revenue that is generated for each of the operating segments. In one embodiment, the visual representations can include interactive visualizations that enable direct manipulation and exploration of representations of data in the visualizations with respect to revenue possibilities from operating the power plant to one more of the plurality of market conditions.

Figure 9:
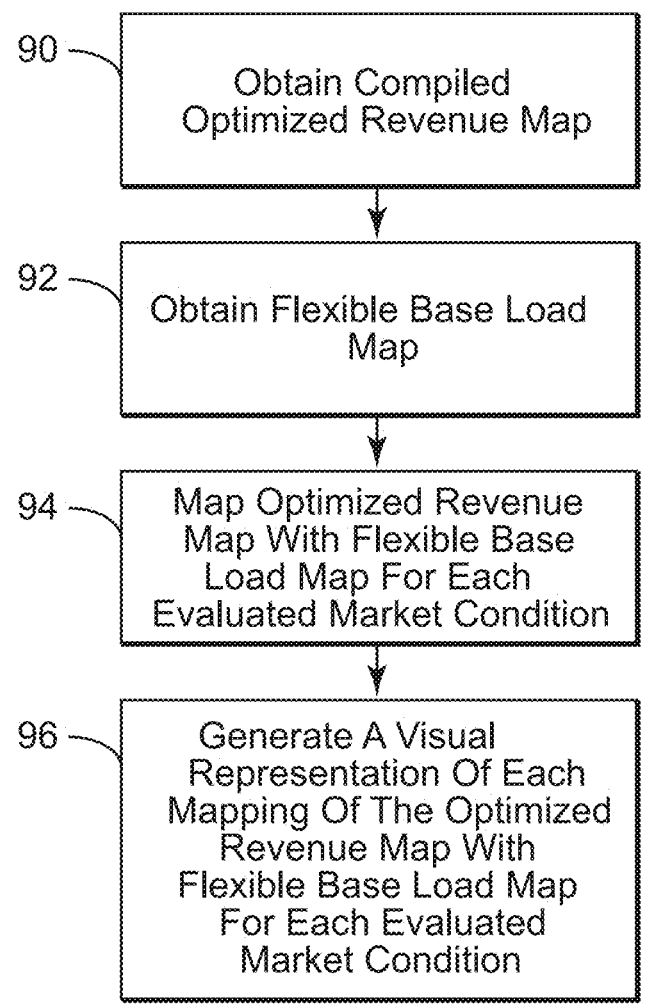
FIG. 9 is flow chart describing examples of operations of an algorithm associated with the optimized revenue/flexible base load map visualization component in accordance with an embodiment of the present invention.

FIG. 9 is flow chart that describes examples of operations performed by the algorithm 86 that is utilized by the optimized revenue/flexible base load map visualization component 24 to generate the visualizations 88 depicted in FIG. 8. As shown in FIG. 9, the algorithm 86 can begin at 90 where the compiled optimized revenue map generated by the operational revenue optimizing component 22 is obtained. In addition, the flexible base load map generated by the flexible base load generation component 20 can be obtained at 92. Next, the optimized revenue map is mapped with the flexible base load map at 94 for each evaluated market condition. In one embodiment, the optimized revenue map can be mapped with the flexible base load map for each evaluated market condition by well-known mapping applications that are commercially available. After the mappings, a visual representation of each mapping can be generated at 96 by well-known visualization applications that are commercially available.

Figure 10:
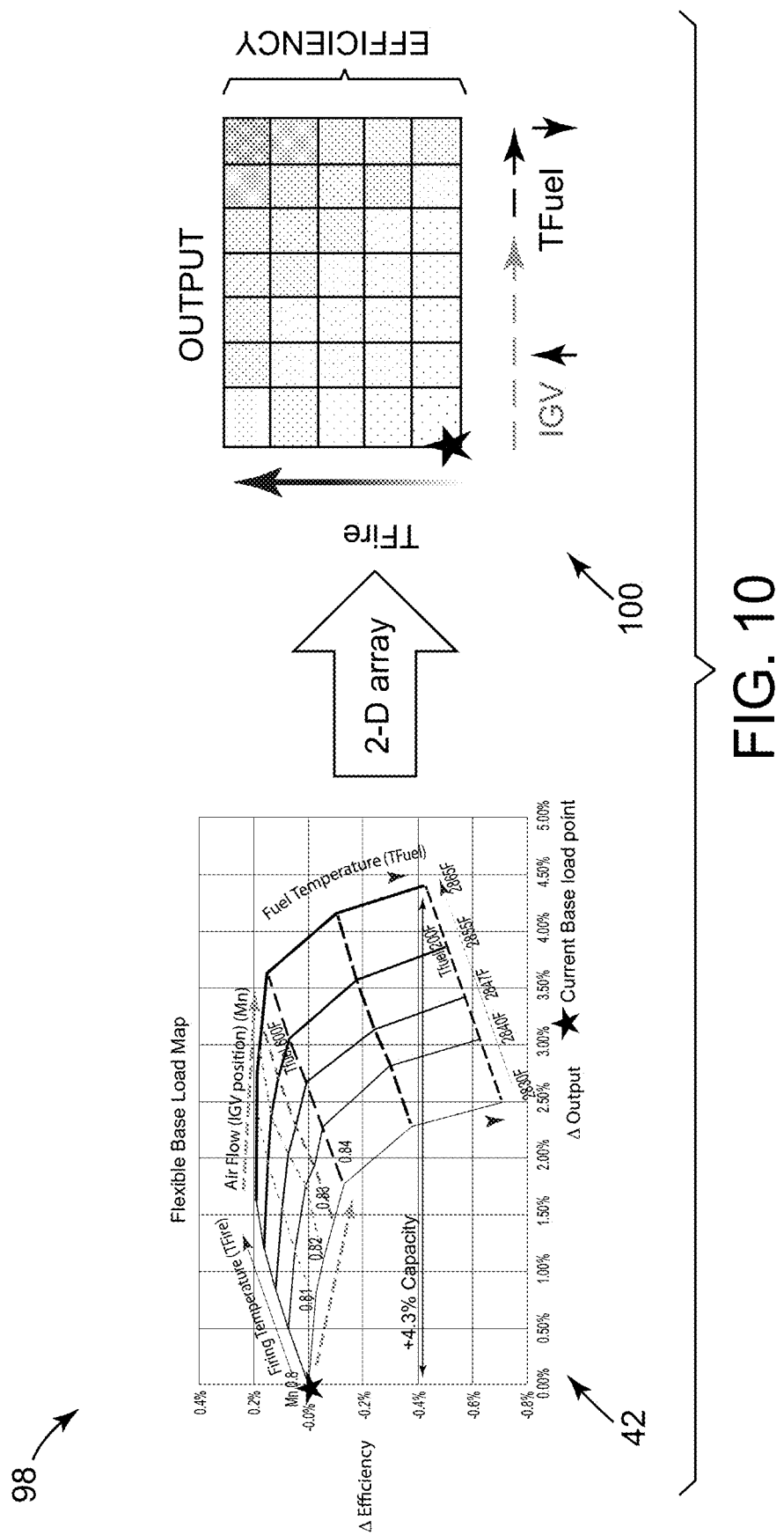
FIG. 10 is an example showing a visualization of an optimized revenue map within a flexible base load map in accordance with an embodiment of the present invention.

FIG. 10 is an example showing a visualization 98 of an optimized revenue map within a flexible base load map in accordance with an embodiment of the present invention. In one embodiment, the visualization can include a two-dimensional array 100 partitioned to show the various operating segments obtained from the flexible base load map. As shown in FIG. 10, the two-dimensional array 100 can comprise a first axis representative of values associated with the firing temperature (TFire), and a second axis representative of values associated with both the position of inlet guide vanes (IGV) in the gas turbine, and the fuel temperature (TFuel) of the fuel in the gas turbine. The two-dimensional array 100 can further include a representation of the efficiency values on the first axis and a representation of the output values on the second axis.

The visualization 98 can further include a visual representation of the revenue that can be earned throughout each of the plurality of operating segments. In particular, the visual representation of the revenue for each operating segment is representative of an amount of revenue that is possible from operating the power plant based on the range of operating values and power output and efficiency values that are attained with the operating values for a respective operating segment. In one embodiment, the visual representation of the revenue can be based on a plurality of visual revenue indicators. In this manner, each visual revenue indicator can be representative of an amount of revenue that is possible from operating the power plant based on the range of operating values and power output and efficiency values that are attained with the operating values for a respective operating segment. In one embodiment, the plurality of visual revenue indicators can comprise a spectrum of revenue visual indicators having a low-end revenue visual indicator, a high-end revenue visual indicator and one or more intermediary revenue visual indicators extending from the low-end revenue visual indicator to the high-end revenue visual indicator. The intermediary revenue visual indicators that are closer to the low-end revenue visual indicator can be indicative of lower revenue and the intermediary revenue visual indicators that are closer to the high-end revenue visual indicator can be indicative of higher revenue. In one embodiment, the amount of revenue associated with the intermediary revenue visual indicators can increase progressively from the intermediary revenue visual indicators that are closer to the low-end revenue visual indicator to the intermediary revenue visual indicators that are closer to the higher-end revenue visual indicator.

As shown in FIG. 10, this spectrum of revenue visual indicators can be represented by shading. In FIG. 10, this spectrum of revenue visual indicators can include dotted patterns with the various densities of dotted patterns each representative of a particular amount of revenue. For example, the dotted patterns of a lesser density (e.g., lower left corner and in the vicinity thereof) can represent high amounts of revenue, the dotted patterns of a higher density and darker shading (e.g., upper right corner and in the vicinity thereof) can represent low amounts of revenue, and the dotted patterns of a varying density that range between the dotted patterns of the lower density and the higher density, can represent varying amounts of intermediary amounts of revenue that are less than the high amounts of revenue and greater than the low amounts of revenue.

It is understood that the visual indicators depicted in FIG. 10 are representative of one possibility and are not meant to be limiting due to the numerous possibilities that could be deployed to represent gradations in the amount of revenue. For example, a color-coded scheme could be used to represent the revenue. In one embodiment, green shading could be used to represent operating segments with the potential to earn the highest amount of revenue, red shading could be used to represent operating segments with the potential to earn the lowest amount of revenue, while lighter shading of green and red could be used to represent operating segments with the potential to earn the amount of revenue that is less than the highest revenue earning segment, and greater than the lowest revenue earning segment, respectively.

Regardless of the type of indicators that are used, the visualization generated for each of the various market conditions according to the various embodiments, can be arranged as a guide and presented to an operator of a power plant. To this extent, the operator can use one or more of the visualizations to select the optimum operating conditions for the power plant to meet base load power demands, while at the same time earning a maximized revenue based on instantiations of the market conditions.

Although not depicted in the visualization shown in FIG. 10, the visualizations that are generated according to the various embodiments can include interactive visualizations that enable direct manipulation and exploration of representations of data in the visualizations with respect to revenue possibilities from operating the power plant to one more of the plurality of market conditions. In one embodiment, the visualizations can be appended with one or more user interactive slider scales configured to receive user-input for moving about each of the operating segments, and one or more input and output buttons for receiving user input data and displaying output data. In this manner an operator can move each of the one or more user interactive slider scales to control at least one of the plurality of operational parameters. To this extent, the manipulation of each of the one or more user interactive slider scales will show a change in revenue that arises with an accompany change to the at least one of the plurality of operational parameters.

In one embodiment, the one or more user interactive slider scales can comprise a first interactive slider scale that is configured to receive changes to the firing temperature (TFire) and a second interactive slider scale that is configured to receive changes to the position of the inlet guide vanes (IGVs) in the gas turbine, and the fuel temperature (TFuel) of the fuel in the gas turbine. For example, the first interactive slider scale and the second interactive slider scale can be configured for movement towards an operating segment that provides maximum revenue.

In another example, the one or more input and output buttons can be configured to receive operating data associated with the operational parameters of the power plant, and target power output and efficiency values. This allows an operator to modify the visualizations based on any data received by the one or more input and output buttons, and be subsequently presented with a modified visualization. The first interactive slider scale and the second interactive slider scale are also configured to allow movement about the modified visualization. This movement of one or more of the first interactive slider scale and the second interactive slider scale can result in a display of an output value associated with the power plant on the one or more input and output buttons that results from the corresponding movement of the slider scales. Illustrations of these functionalities are depicted and discussed in relation to FIGS. 13 and 14A-14C.

Figure 11:
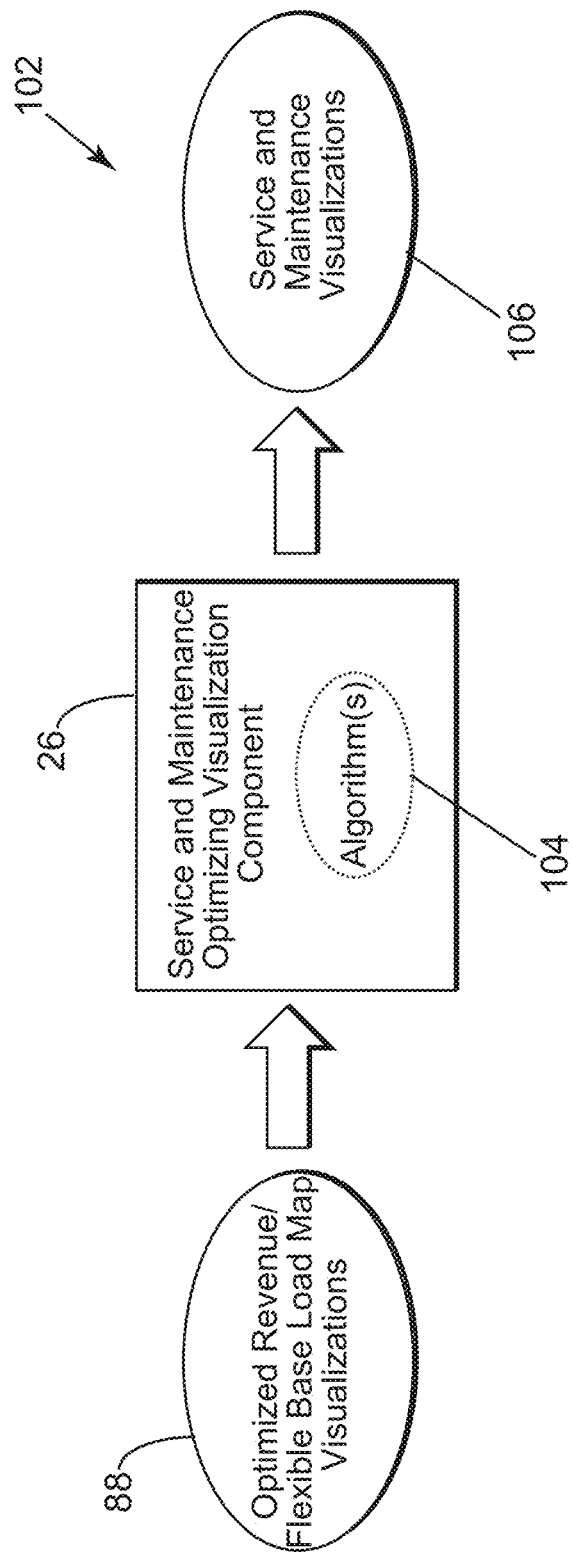
FIG. 11 is a block diagram illustrating example data inputs and outputs for the service and maintenance optimizing visualization component of the dispatch advisor system depicted in FIG. 2 in accordance with an embodiment of the present invention.

FIG. 11 is a block diagram 102 illustrating example data inputs and outputs for the service and maintenance optimizing visualization component 26 depicted in FIG. 2 in accordance with an embodiment of the present invention. More particularly, the block diagram 102 of FIG. 11 illustrates that the service and maintenance optimizing visualization component 26 is configured to utilize one or more algorithms 104 for operating on the visualizations 88 generated from the optimized revenue—flexible base load visualization component 24 in order to furnish service and maintenance visualizations 106 that offer an indication how operating conditions in the revenue transposed flexible base load visualizations will have on the service and maintenance of the various parts and components in a power plant. To this extent, operators can use this information to assess the impact that the operating space of the revenue transposed flexible base load visualizations will have on the maintenance and service of parts of the power plant based on the operating conditions associated with each of the operating segments. For example, an operator can use the service and maintenance visualizations 106 to note that certain higher firing temperatures in certain market conditions can come at price to the service and maintenance of the power plant because such high temperatures will reduce the life cycle parts and require maintenance cost to keep running and eventual replacement costs. As a result, the operator can refer to other operating sections in the service and maintenance visualizations 106 that will have less impact on service and maintenance, with an overall better operational revenue in comparison to those sections that could potentially have better revenue but for the effect that such corresponding values will have on service and maintenance.

Figure 12:
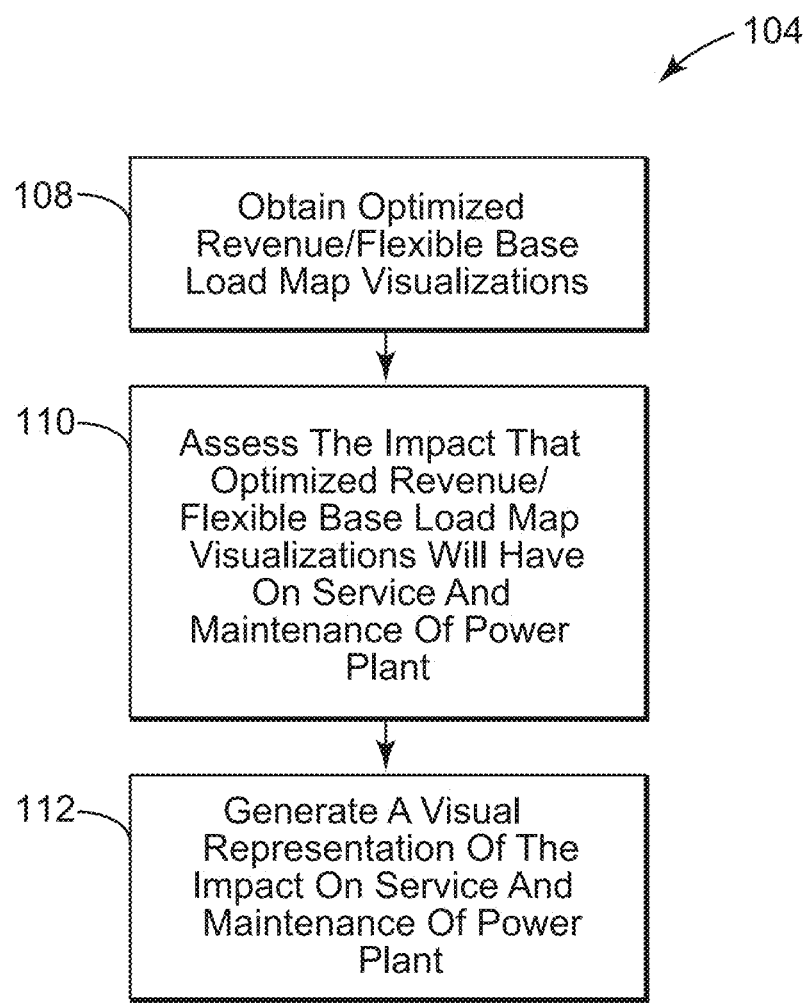
FIG. 12 is flow chart describing examples of operations of an algorithm associated with the service and maintenance optimizing visualization component in accordance with an embodiment of the present invention.

FIG. 12 is flow chart describing examples of operations performed by the algorithm 104 associated with the service and maintenance optimizing visualization component 26 to generate the service and maintenance visualizations 106 depicted in FIG. 11. As shown in FIG. 12, the algorithm 104 can begin at 108 where the optimized revenue/flexible base load map visualizations generated by the optimized revenue/flexible base load map visualization component 24 are obtained. Next, the impact that these optimized revenue/flexible base load map visualizations will have on service and maintenance of a power plant is assessed at 110. In one embodiment, this assessment can include performing a tradeoff analysis between operating conditions and their effect on services cost.

After the assessment, a visual representation can be generated at 112. In one embodiment, the visualizations can be generated by using well-known visualization applications that are commercially available. With the service and maintenance visualizations available, a plant operator can use them to forecast operational scenarios, manage outages and power plant availability in a manner that ensures that revenue is maximized.

While, for purposes of simplicity of explanation, the operations shown in FIGS. 4, 7, 9, and 12 are described as a series of acts. It is to be understood and appreciated that the subject innovation associated with FIGS. 4, 7, 9, and 12 is not limited by the order of acts, as some acts may, in accordance therewith, occur in a different order and/or concurrently with other acts from that shown and described herein. For example, those skilled in the art will understand and appreciate that a methodology or operations depicted in FIGS. 4, 7, 9, and 12 could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 13:
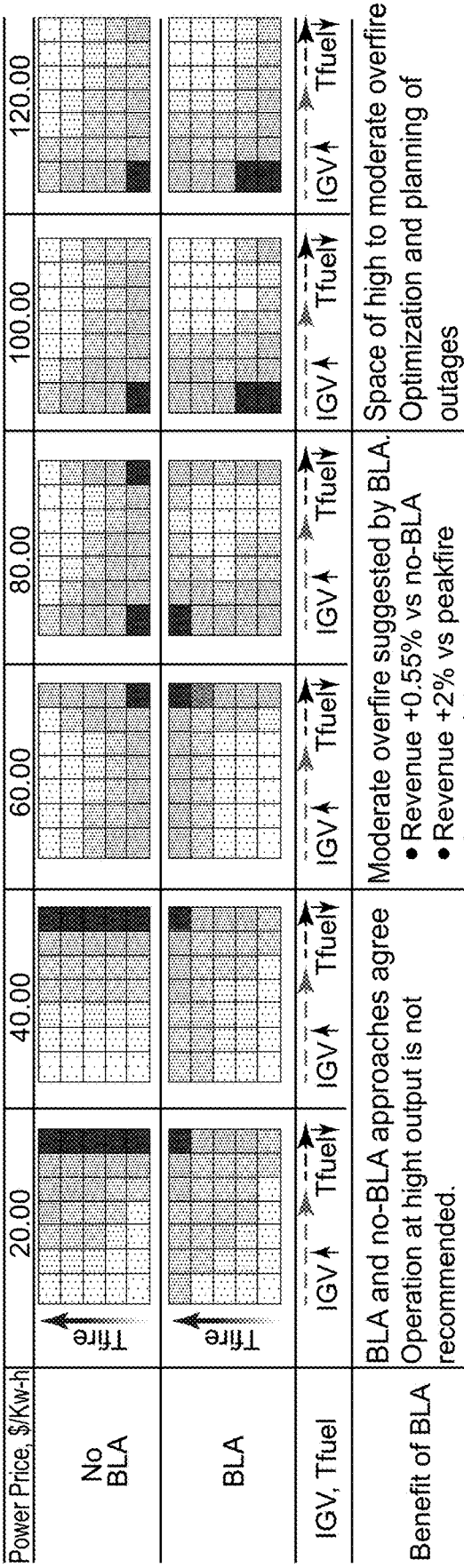
FIG. 13 is an example showing a visualization of optimized revenue within a flexible base load map for variable spot market pricing in accordance with an embodiment of the present invention.

FIG. 13 is an example showing a visualization of optimized revenue within a flexible base load map for variable spot market pricing in accordance with an embodiment of the present invention. In particular, this example shows some of the aforementioned benefits of using the dispatch advisor system 18 in comparison to an approach that does not have the capabilities of the various embodiments described herein. In this example of FIG. 13, the dispatch advisor system 18 is depicted as Base Load Adviser (BLA), and the non-dispatch advisor system portion is depicted as No BLA. The market condition that is taken into consideration in this example is spot market power pricing. As shown in FIG. 13, the spot market power pricing is variable as it evaluates scenarios in which the power price can include 20, 40, 60, 80, 100, and 120 $/MW-hr.

With the variable power pricing, the optimal point of operation within the spot market condition will change. As shown in FIG. 13, the dispatch advisor system 18 (BLA) takes into account the impact of Tfire and Tcd on combustion, the hot gas path components and rotor life including service expenses and maintenance factors, as well as the fuel expenses and $CO_2$ taxes, and thus, the impact of services on operating expenditures. Inclusion of service expenses and maintenance factors, as well as the fuel expenses and $CO_2$ taxes, and their impact thereof, increases operational revenue, increases availability of the power plant, and allows for outage management.

All of these considerations and their impact, which are taken into account in the example of FIG. 13 for the BLA portion can provide different assessments and recommendations for operation in most scenarios than that provided by the No BLA scenario. As shown in FIG. 13, in the 20 $/MW-hr and 40 $/MW-hr scenarios, the BLA and the no-BLA approaches can agree that operation of the power plant at a high output are not recommended. However, in the 60 $/MW-hr and 80 $/MW-hr scenarios, the recommendations in the BLA and the no-BLA approaches can differ. For example, the differing recommendations can lead to +0.55 increase in revenue for the BLA approach in comparison to the no-BLA approach, and that the revenue increase is 2% versus peak fire, due to the BLA recommending moderate overfire (the amount of increase in Tfire), as compared to the no-BLA approach. As a result of this assessment, the BLA approach will require lower maintenance, and thus, the power plant will have higher availability in comparison to the no-BLA approach. In the 100 $/MW-hr and 120 $/MW-hr scenarios, the recommendations in the BLA and the no-BLA approaches can differ in the operating segments that represent high to moderate overfiring. As a result of having different assessments for some of the overfiring segments and the Tfuel segments, the BLA approach can result in more availability (e.g., 1.97%) and be prepared for more outages (e.g., 2). From the scenarios depicted in FIG. 13, it is evident that when the power plant is dispatched at required output, which is different from an optimal operating point within the flexible base load space, the BLA approach (i.e., the dispatch advisor system 18) can suggest a gas turbine setting at which the plant is dispatched with optimum possible economics.

Figure 14A:
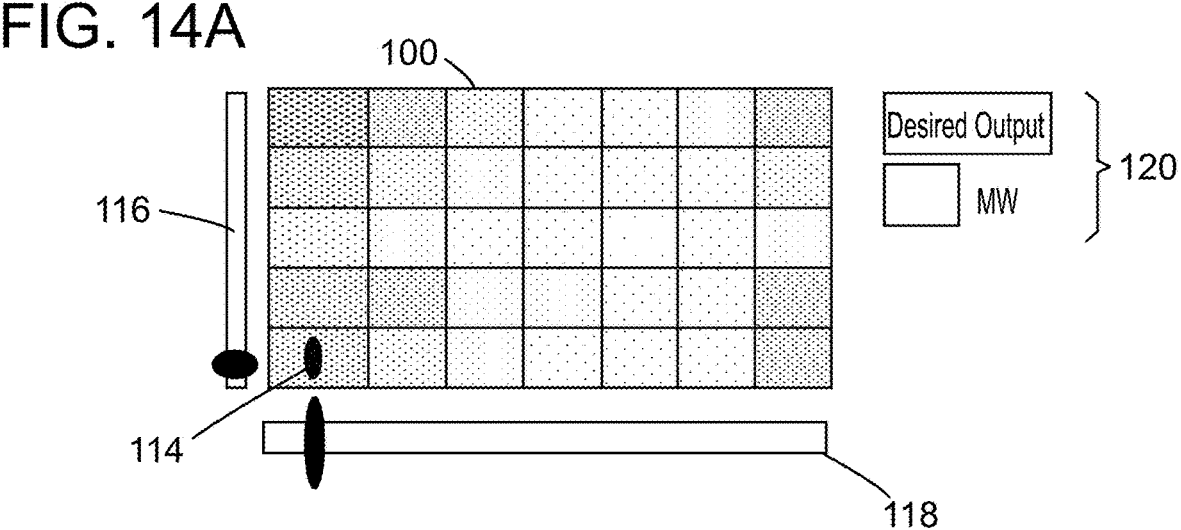
FIGS. 14A-14C illustrate examples how a plant operator could use the dispatch advisor system depicted in FIG. 2 to manage a power plant in accordance with various embodiments of the present invention.
Figure 14B:
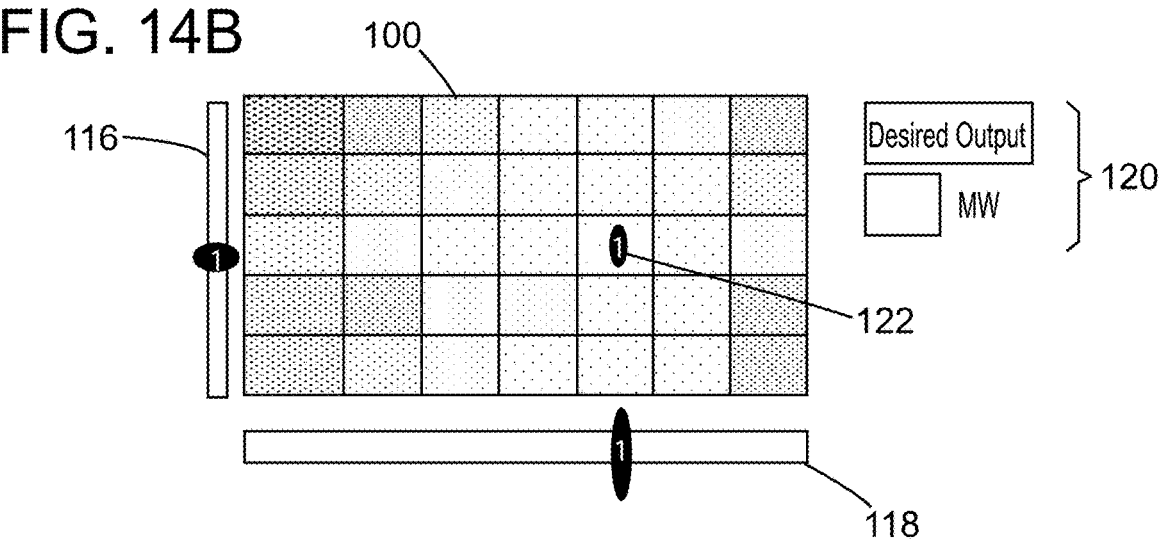
Figure 14C:
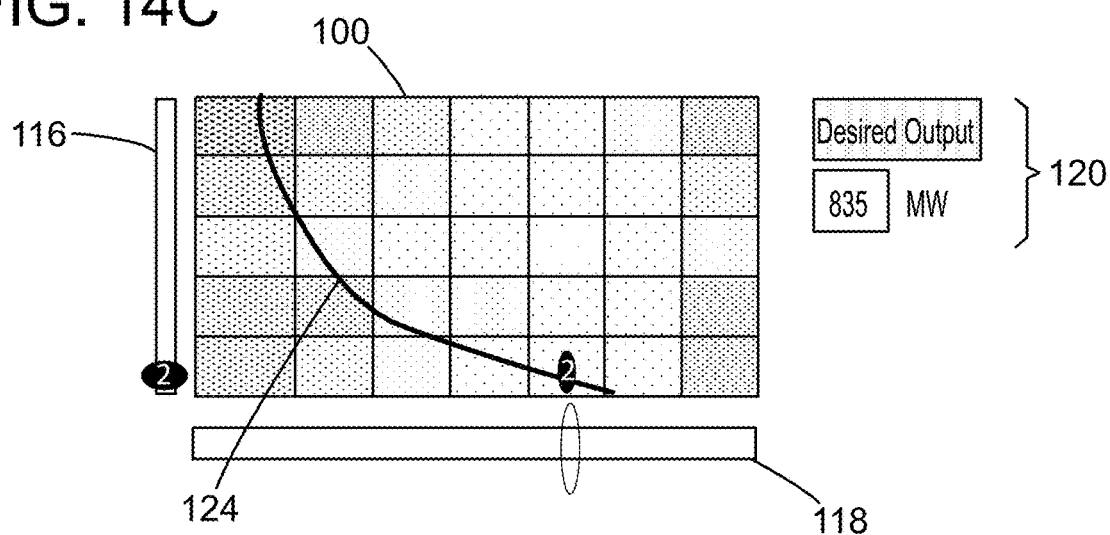

FIGS. 14A-14C illustrates examples how a plant operator could use the dispatch advisor system 18 depicted in FIG. 2 to manage a power plant in accordance with various embodiments of the present invention. As shown in these examples, there are several ways that a plant operator may utilize the dispatch advisor system 18 for on-line guidance of operations and for off-line planning purposes. It is understood that the examples illustrated in FIGS. 14A-14C are merely illustrative of only a few possibilities describing how a plant operator could use the dispatch advisor system 18 to manage the operation of a power plant and are not meant to be limiting.

FIG. 14A depicts an example of how a plant operator could utilize the dispatch advisor system 18 for on-line guidance. As shown in FIG. 14A, the nominal base operating point 114 is Tfire=2830 F, Mn=0.796. In a scenario in which the gas turbine output exceeds the nominal base operating point 114, the dispatch advisor system 18 can be configured to provide the plant operator with the guidance regarding the operation of the turbine. Assuming that inputs are complete and the operating revenue across the flexible base load area has been calculated, the dispatch advisor system 18, and interactive visualization screen like that depicted in FIG. 14A can be presented to the operator. The visualization screen of FIG. 14A, as well as the one shown in FIGS. 14B-14C, can include a two-dimensional array 100 showing the partitioned operating spaces with the operational revenue assessment for each segment. The visualization screen can further include user interactive slider scales 116 and 118. In one embodiment, the interactive slider scale 116 can be configured to change the firing temperature and the interactive slider scale 118 can be configured to change the position of the inlet guide vanes in the gas turbine, and the fuel temperature of the fuel in the gas turbine. In addition, the visualization screens of FIG. 14A-14C can include input and output buttons 120 for receiving user input data and displaying output data. In one embodiment, the input and output buttons 120 can be used to depict and enter values for the power plant output. With this configuration, the plant operator can control the gas turbine and the power plant output setting anywhere within the flexible base load space depicted in the two-dimensional array 100 by moving the interactive slider scales 116, 118 within their corresponding ranges.

FIG. 14B illustrates a scenario in which a plant operator could use a visualization screen provided by the dispatch advisor system 18 to run a power plant to a maximum revenue. In the example of FIG. 14B, the plant operator can manually position both interactive slider scales 116 and 118 to find a target point 122 with an area indicated as having the most revenue. This corresponds to settings for Tfire and Mn that yield the highest operational revenue.

FIG. 14C illustrates a scenario in which a plant operator could use a visualization screen provided by the dispatch advisor system 18 to run a power plant to a defined output. In the example of FIG. 14C, the plant operator can enable this mode by clicking on the Desired Output button of the input/outputs 120 displayed on the visualization screen. The plant operator can then enter the required output (e.g., 835 MW) in the Desired Output button. When an output is entered and activated by this operator action, a line of constant power plant output 124 is added to the flexible base load space depicted in the two-dimensional array 100.

At the same time, the horizontal interactive slider scale 118 can be deactivated, and as a result, the gas turbine will be controlled by manually setting Tfire using the interactive slider scale 116. The gas turbine IGV setting can then automatically adjust to maintain the Desired Output entered by the operator.

Figure 15:
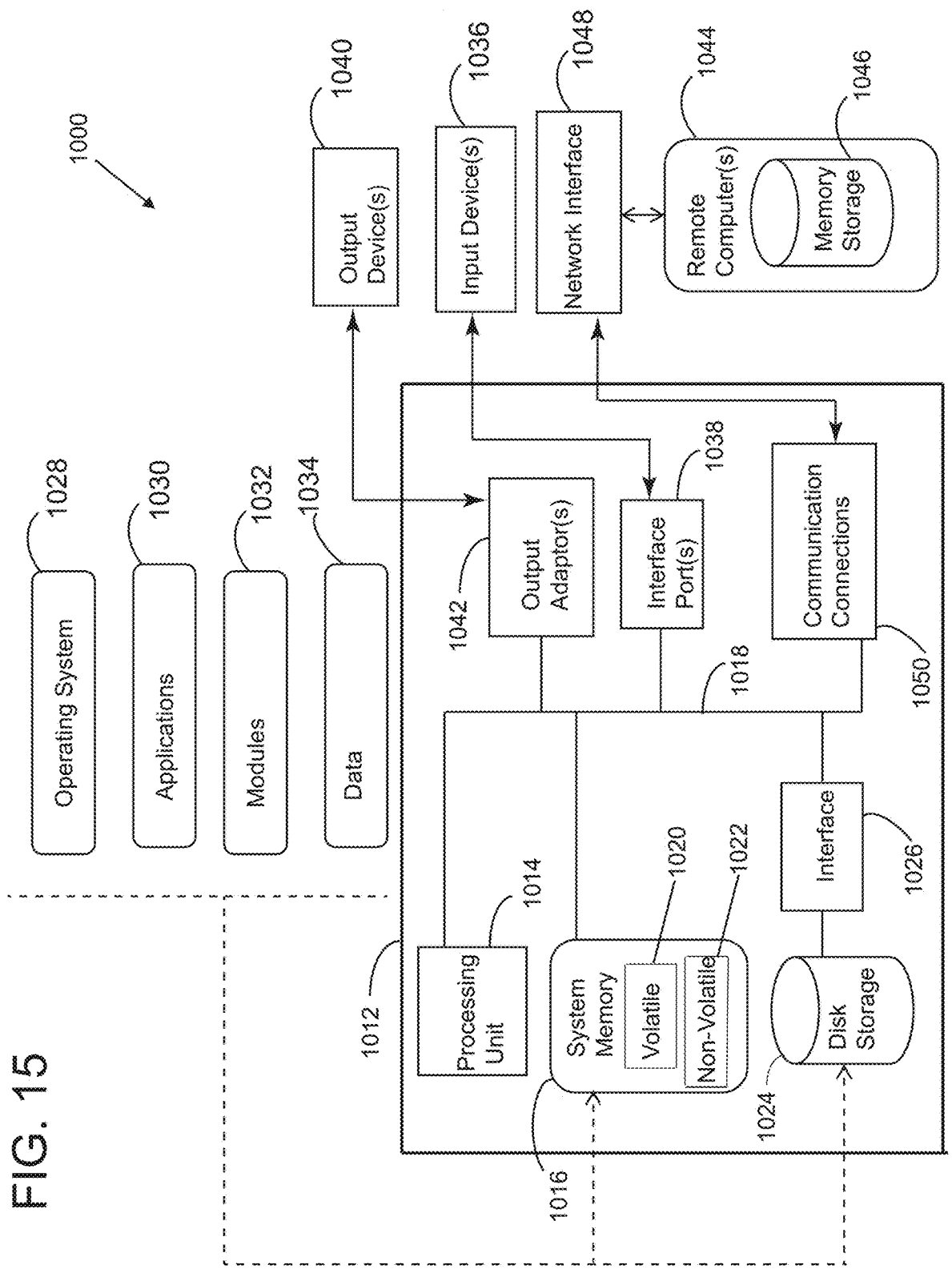
FIG. 15 is an example computing environment in which the various embodiments may be implemented.
Figure 16:
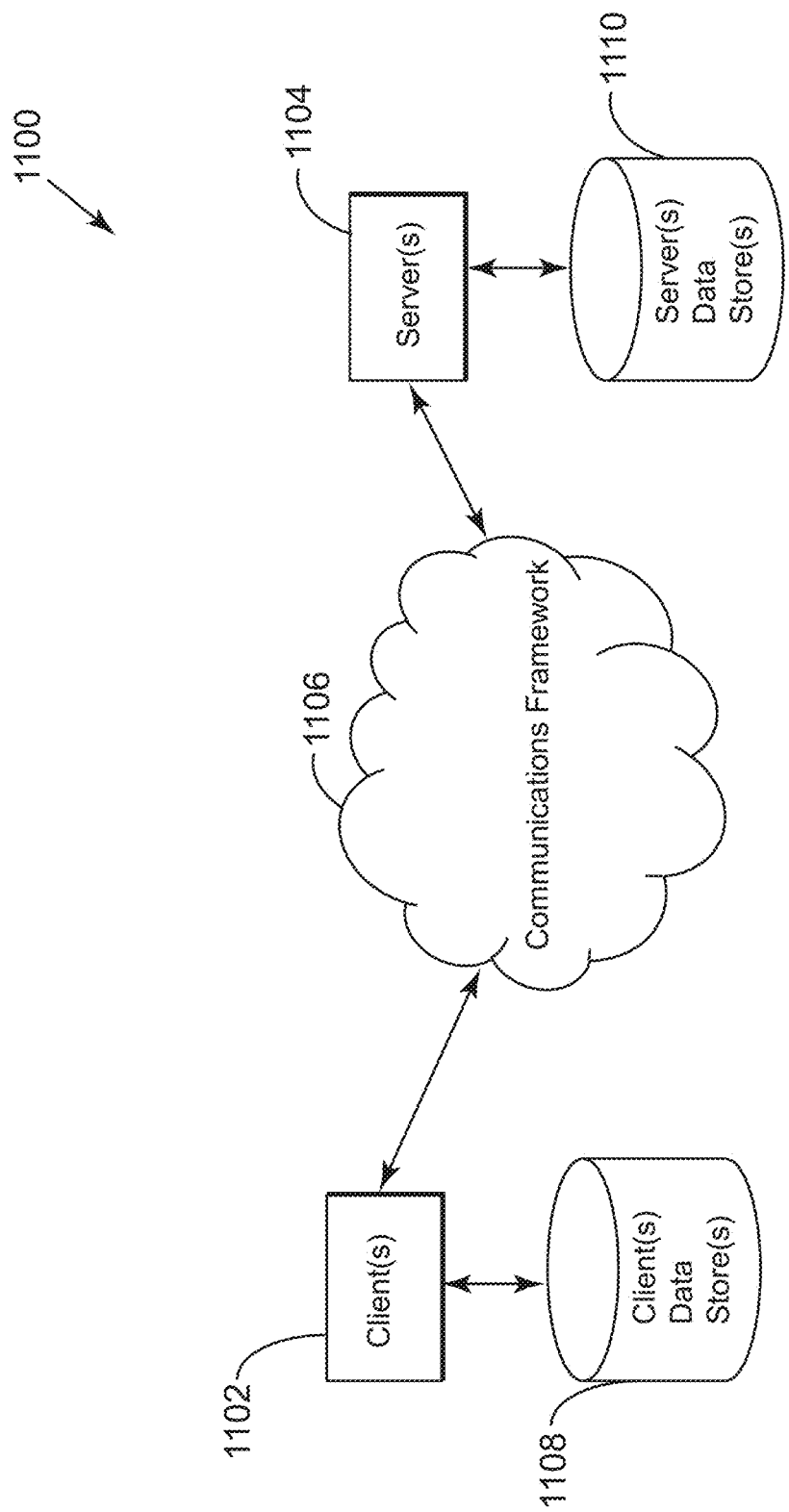
FIG. 16 is an example networking environment in which the various embodiments may be implemented.

In order to provide a context for the various aspects of the disclosed subject matter, FIGS. 15 and 16 as well as the following discussion are intended to provide a brief, general description of a suitable environment in which the various aspects of the disclosed subject matter may be implemented.

With reference to FIG. 15, an example environment 1000 for implementing various aspects of the aforementioned subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Multi-core microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable PROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/nonvolatile computer storage media. FIG. 15 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used such as interface 1026.

It is to be appreciated that FIG. 15 describes software that acts as an intermediary between users and the basic computer resources described in suitable operating environment 1000. Such software includes an operating system 1028. Operating system 1028, which can be stored on disk storage 1024, acts to control and allocate resources of the computer 1012. System applications 1030 take advantage of the management of resources by operating system 1028 through program modules 1032 and program data 1034 stored either in system memory 1016 or on disk storage 1024. It is to be appreciated that one or more embodiments of the subject disclosure can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapters 1042 are provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the system bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 16 is a schematic block diagram of a sample computing environment 1100 with which the disclosed subject matter can interact. The sample computing environment 1100 includes one or more client(s) 1102. The client(s) 1102 can be hardware and/or software (e.g., threads, processes, computing devices). The sample computing environment 1100 also includes one or more server(s) 1104. The server(s) 1104 can also be hardware and/or software (e.g., threads, processes, computing devices). The servers 1104 can house threads to perform transformations by employing one or more embodiments as described herein, for example. One possible communication between a client 1102 and servers 1104 can be in the form of a data packet adapted to be transmitted between two or more computer processes. The sample computing environment 1100 includes a communication framework 1106 that can be employed to facilitate communications between the client(s) 1102 and the server(s) 1104. The client(s) 1102 are operably connected to one or more client data store(s) 1108 that can be employed to store information local to the client(s) 1102. Similarly, the server(s) 1104 are operably connected to one or more server data store(s) 1110 that can be employed to store information local to the servers 1104.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Therefore, since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below. For example, references to "one embodiment" of the present invention are not intended to be interpreted as excluding the existence of additional embodiments that also incorporate the recited features.

In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. The terms "substantially," "generally," and "about" indicate conditions within reasonably achievable manufacturing and assembly tolerances, relative to ideal desired conditions suitable for achieving the functional purpose of a component or assembly. Further, the limitations of the following claims are not written in means-plus-function format and are not intended to be interpreted as such, unless and until such claim limitations expressly use the phrase "means for" followed by a statement of function void of further structure.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings, such terms are intended to be inclusive in a manner similar to the term "comprising" as "comprising" is interpreted when employed as a transitional word in a claim. That is, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A method for assisting in selecting operating conditions of a power plant having at least one gas turbine that maximizes operational revenue, comprising: obtaining, by a system comprising at least one processor, a flexible base load map for operating the power plant to meet base load power demands, wherein the flexible base load map includes a primary base load operating space for attaining target plant power output and efficiency, and an expanded base load portion for attaining higher plant power output and sub-optimal efficiency in relation to the primary base load operating space, both the primary base load operating space and the expanded base load portion including a representation that associates power output and efficiency values of the power plant that result from a subset of operational parameter values for operating the power plant during base load, the operational parameters including firing temperature of the gas turbine, a position of inlet guide vanes in the gas turbine, and fuel temperature of the fuel in the gas turbine; partitioning, by the system, the flexible base load map into a plurality of operating segments, each operating segment including a range of operating values for the operational parameters and corresponding power output and efficiency values that are attained while operating the power plant at the range of operating values in the operating segment; for each of the plurality of operating segments, determining, by the system, revenue that is generated from operating the power plant over the range of operating values that attain the corresponding power output and efficiency values taking into consideration at least one of a plurality of market conditions associated with a power generation market; generating, by the system, a plurality of visualizations of the revenue associated with each of the operating segments in the partitioned flexible base load map for each of the plurality of market conditions, wherein each visualization of the revenue determined for the plurality of market conditions includes a visual representation of the revenue associated with operating the power plant in each of the plurality of operating segments based on the respective range of operating values and power output and efficiency values that are attained with the operating values; and presenting for display, with the system, one or more of the plurality of visualizations of the revenue associated with each of the operating segments in the partitioned flexible base load map for each of the plurality of market conditions.

The method of the preceding clause, wherein the partitioning of the flexible base load map comprises mapping the primary base load operating space and the expanded base load portion into a two-dimensional array.

The method of any of the preceding clauses, wherein the two-dimensional array comprises a first axis representative of values associated with the firing temperature, and a second axis representative of values associated with both the position of inlet guide vanes in the gas turbine, and the fuel temperature of the fuel in the gas turbine, wherein the two-dimensional array further comprises a representation of the efficiency values on the first axis and a representation of the output values on the second axis.

The method of any of the preceding clauses, wherein the determining of revenue of operating the power plant over each of the plurality of operating segments comprises ascertaining, by the system, income from capacity payments for power commitments entered into over a capacity market, and income from power sold at a spot market.

The method of any of the preceding clauses, wherein the determining of revenue of operating the power plant over each of the plurality of operating segments further comprises ascertaining expenses of operating the plant over each of the plurality of operating segments.

The method of any of the preceding clauses, wherein the determining of revenue of operating the power plant over each of the plurality of operating segments further comprises debiting, by the system, a sum of the income from the capacity payments and the income from power sold at a spot market with the expenses of operating the power plant in the segments.

The method of any of the preceding clauses, wherein the expenses comprise one or more of fuel expenses associated with purchasing fuel for operating the power plant, carbon taxes for emissions created from use of fossil fuels for power generation, and service expenses associated with servicing and maintenance of the power plant.

The method of any of the preceding clauses, wherein the plurality of market conditions comprise variable spot market power prices of power sold at a spot market, capacity payment rates for power commitments entered into over a capacity market, fuel expenses associated with purchasing fuel for operating the power plant, and carbon taxes for emissions created from use of fossil fuels for power generation.

The method of any of the preceding clauses, wherein the visual representation of the revenue is selected from a plurality of visual revenue indicators, each visual revenue indicator representative of an amount of revenue that is possible from operating the power plant based on the range of operating values and power output and efficiency values that are attained with the operating values for a respective operating segment.

The method of any of the preceding clauses, wherein each of the plurality of visualizations of the revenue associated with each of the operating segments in the partitioned flexible base load map for each of the plurality of market conditions are arranged as a guide in selection of optimum operating conditions for the power plant to meet base load power demands at maximized revenue based on instantiations of the market conditions.

The method of any of the preceding clauses, wherein the plurality of visual representations include interactive visualizations that enable a power plant operator direct manipulation and exploration of representations of data in the visualizations with respect to revenue possibilities from operating the power plant to one more of the plurality of market conditions.

A system, comprising: a memory that stores executable components; a processor, operatively coupled to the memory, that executes the executable components, the executable components comprising: a dispatch advisor system for assisting in selecting operating conditions of a power plant having at least one gas turbine that maximizes operational revenue, the dispatch advisor system configured to perform the method comprising: obtaining, by the processor, a flexible base load map for operating the power plant to meet base load power demands, wherein the flexible base load map includes a primary base load operating space for attaining target plant power output and efficiency, and an expanded base load portion for attaining higher plant power output and sub-optimal efficiency in relation to the primary base load operating space, both the primary base load operating space and the expanded base load portion including a representation that associates power output and efficiency values of the power plant that result from a subset of operational parameter values for operating the power plant during base load, the operational parameters including firing temperature of the gas turbine, a position of inlet guide vanes in the gas turbine, and fuel temperature of the fuel in the gas turbine; partitioning, by the processor, the flexible base load map into a plurality of operating segments, each operating segment including a range of operating values for the operational parameters and corresponding power output and efficiency values that are attained while operating the power plant at the range of operating values in the operating segment; for each of the plurality of operating segments, determining, by the processor, revenue that is generated from operating the power plant over the range of operating values that attain the corresponding power output and efficiency values taking into consideration at least one of a plurality of market conditions associated with a power generation market; generating, by the processor, a plurality of visualizations of the revenue associated with each of the operating segments in the partitioned flexible base load map for each of the plurality of market conditions, wherein each visualization of the revenue determined for the plurality of market conditions includes a visual representation of the revenue associated with operating the power plant in each of the plurality of operating segments based on the respective range of operating values and power output and efficiency values that are attained with the operating values; and presenting for display, with the processor, one or more of the plurality of visualizations of the revenue associated with each of the operating segments in the partitioned flexible base load map for each of the plurality of market conditions.

The system of the preceding clause, wherein the presenting for display of the one or more of the plurality of visualizations of the revenue associated with each of the operating segments in the partitioned flexible base load map for each of the plurality of market conditions, comprises appending, with the processor, one or more user interactive slider scales configured to receive user-input for moving about each of the operating segments in the partitioned flexible base load map, and one or more input and output buttons for receiving user input data and displaying output data.

The system of any of the preceding clauses, wherein movements of each of the one or more user interactive slider scales controls at least one of the plurality of operational parameters, wherein manipulation of each of the one or more user interactive slider scales shows a change in revenue that arises with an accompany change to the at least one of the plurality of operational parameters.

The system of any of the preceding clauses, wherein the one or more user interactive slider scales comprises a first interactive slider scale configured to receive changes to the firing temperature and a second interactive slider scale configured to receive changes to the position of the inlet guide vanes in the gas turbine, and the fuel temperature of the fuel in the gas turbine.

The system of any of the preceding clauses, wherein the first interactive slider scale and the second interactive slider scale are configured for movement towards an operating segment in the partitioned flexible base load map that provides maximum revenue.

The system of any of the preceding clauses, wherein the one or more input and output buttons is configured to receive operating data associated with the operational parameters of the power plant and target power output and efficiency values.

The system of any of the preceding clauses, further comprising modifying, with the processor, the plurality of visualizations of the revenue associated with each of the operating segments in the partitioned flexible base load map based on any data received by the one or more input and output buttons, and presenting, with the processor, a modified visualization.

The system of any of the preceding clauses, wherein the first interactive slider scale and the second interactive slider scale are configured for movement about the modified visualization, wherein movement of one or more of the first interactive slider scale and the second interactive slider scale results in a display of an output value associated with the power plant on the one or more input and output buttons that results from the corresponding movement of the slider scales.

A non-transitory computer-readable medium having stored thereon executable instructions that, in response to execution, cause a system comprising at least one processor to perform operations directed to generating a dispatch advisor system for assisting in selecting operating conditions of a power plant having at least one gas turbine that maximizes operational revenue, the operations comprising: obtaining a flexible base load map for operating the power plant to meet base load power demands, wherein the flexible base load map includes a primary base load operating space for attaining target plant power output and efficiency, and an expanded base load portion for attaining higher plant power output and sub-optimal efficiency in relation to the primary base load operating space, both the primary base load operating space and the expanded base load portion including a representation that associates power output and efficiency values of the power plant that result from a subset of operational parameter values for operating the power plant during base load, the operational parameters including firing temperature of the gas turbine, a position of inlet guide vanes in the gas turbine, and fuel temperature of the fuel in the gas turbine; partitioning the flexible base load map into a plurality of operating segments, each operating segment including a range of operating values for the operational parameters and corresponding power output and efficiency values that are attained while operating the power plant at the range of operating values in the operating segment; for each of the plurality of operating segments, determining revenue that is generated from operating the power plant over the range of operating values that attain the corresponding power output and efficiency values taking into consideration at least one of a plurality of market conditions associated with a power generation market; generating a plurality of visualizations of the revenue associated with each of the operating segments in the partitioned flexible base load map for each of the plurality of market conditions, wherein each visualization of the revenue determined for the plurality of market conditions includes a visual representation of the revenue associated with operating the power plant in each of the plurality of operating segments based on the respective range of operating values and power output and efficiency values that are attained with the operating values; and presenting for display one or more of the plurality of visualizations of the revenue associated with each of the operating segments in the partitioned flexible base load map for each of the plurality of market conditions.

What is claimed is:

1. A method for operating a power plant having at least one gas turbine, comprising:
   operating the power plant at an ambient condition and a load condition;
   obtaining, by a system comprising at least one processor, a flexible base load map for operating the power plant to meet base load power demands, wherein the flexible base load map includes a primary base load operating space for attaining target plant power output and efficiency, and an expanded base load portion for attaining higher plant power output and sub-optimal efficiency in relation to the primary base load operating space, both the primary base load operating space and the expanded base load portion including a representation that associates power output and efficiency values of the power plant that result from a subset of operational parameter values for operating the power plant during base load, the operational parameters including firing temperature of the at least one gas turbine, a position of inlet guide vanes in the at least one gas turbine, and fuel temperature of the fuel in the at least one gas turbine;
   partitioning, by the system, the flexible base load map into a plurality of operating segments, each operating segment including a range of operating values for the operational parameters and corresponding power output and efficiency values that are attained while operating the power plant at the range of operating values in the operating segment;
   for each of the plurality of operating segments, determining, by the system, revenue that is generated from operating the power plant over the range of operating values that attain the corresponding power output and efficiency values taking into consideration at least one of a plurality of market conditions associated with a power generation market;
   generating, by the system, a plurality of visualizations of the revenue associated with each of the operating segments in the partitioned flexible base load map for each of the plurality of market conditions, wherein each visualization of the revenue determined for the plurality of market conditions includes a visual representation of the revenue associated with operating the power plant in each of the plurality of operating segments based on the respective range of operating values and power output and efficiency values that are attained with the operating values;
   presenting for display, with the system, one or more of the plurality of visualizations of the revenue associated with each of the operating segments in the partitioned flexible base load map for each of the plurality of market conditions; and
   adjusting, by the system, the operation of the power plant in response to the obtaining of the flexible base load map, the partitioning of the flexible base load map into the plurality of operating segments, the determining of the revenue for each of the plurality of operating segments, and the presenting of the one or more of the plurality of visualizations of the revenue associated with each of the operating segments, wherein the adjusting of the operation of the power plant includes automatically adjusting at least one of the firing temperature, a Mach number, and/or fuel temperature of the at least one gas turbine.

2. The method of claim 1, wherein the partitioning of the flexible base load map comprises mapping the primary base load operating space and the expanded base load portion into a two-dimensional array.

3. The method of claim 2, wherein the two-dimensional array comprises a first axis representative of values associated with the firing temperature, and a second axis representative of values associated with both the position of inlet guide vanes in the at least one gas turbine, and the fuel temperature of the fuel in the at least one gas turbine, wherein the two-dimensional array further comprises a representation of the efficiency values on the first axis and a representation of the output values on the second axis.

4. The method of claim 1, wherein the determining of revenue of operating the power plant over each of the plurality of operating segments comprises ascertaining, by the system, income from capacity payments for power commitments entered into over a capacity market, and income from power sold at a spot market.

5. The method of claim 4, wherein the determining of revenue of operating the power plant over each of the plurality of operating segments further comprises ascertaining expenses of operating the power plant over each of the plurality of operating segments.

6. The method of claim 5, wherein the determining of revenue of operating the power plant over each of the plurality of operating segments further comprises debiting, by the system, a sum of the income from the capacity payments and the income from power sold at a spot market with the expenses of operating the power plant in the segments.

7. The method of claim 5, wherein the expenses comprise one or more of fuel expenses associated with purchasing fuel for operating the power plant, carbon taxes for emissions created from use of fossil fuels for power generation, and service expenses associated with servicing and maintenance of the power plant.

8. The method of claim 1, wherein the plurality of market conditions comprise variable spot market power prices of power sold at a spot market, capacity payment rates for power commitments entered into over a capacity market, fuel expenses associated with purchasing fuel for operating the power plant, and carbon taxes for emissions created from use of fossil fuels for power generation.

9. The method of claim 1, wherein the visual representation of the revenue is selected from a plurality of visual revenue indicators, each visual revenue indicator representative of an amount of revenue that is possible from operating the power plant based on the range of operating values and power output and efficiency values that are attained with the operating values for a respective operating segment.

10. The method of claim 1, wherein each of the plurality of visualizations of the revenue associated with each of the operating segments in the partitioned flexible base load map for each of the plurality of market conditions are arranged as a guide in selection of optimum operating conditions for the power plant to meet base load power demands at maximized revenue based on instantiations of the market conditions.

11. The method of claim 1, wherein the plurality of visual representations include interactive visualizations that enable a power plant operator direct manipulation and exploration of representations of data in the visualizations with respect to revenue possibilities from operating the power plant to one more of the plurality of market conditions.

12. A system, comprising:
a power plant having at least one gas turbine operating at an ambient condition and a load condition;
a power plant controller to control operation of the power plant, the power plant controller including:
a memory that stores executable components;
a processor, operatively coupled to the memory, that executes the executable components, the executable components comprising:
a dispatch advisor system for assisting in selecting operating conditions of the power plant, the dispatch advisor system configured to perform the method comprising:
obtaining, by the processor, a flexible base load map for operating the power plant to meet base load power demands, wherein the flexible base load map includes a primary base load operating space for attaining target plant power output and efficiency, and an expanded base load portion for attaining higher plant power output and sub-optimal efficiency in relation to the primary base load operating space, both the primary base load operating space and the expanded base load portion including a representation that associates power output and efficiency values of the power plant that result from a subset of operational parameter values for operating the power plant during base load, the operational parameters including firing temperature of the at least one gas turbine, a position of inlet guide vanes in the at least one gas turbine, and fuel temperature of the fuel in the at least one gas turbine;
partitioning, by the processor, the flexible base load map into a plurality of operating segments, each operating segment including a range of operating values for the operational parameters and corresponding power output and efficiency values that are attained while operating the power plant at the range of operating values in the operating segment;
for each of the plurality of operating segments, determining, by the processor, revenue that is generated from operating the power plant over the range of operating values that attain the corresponding power output and efficiency values taking into consideration at least one of a plurality of market conditions associated with a power generation market;
generating, by the processor, a plurality of visualizations of the revenue associated with each of the operating segments in the partitioned flexible base load map for each of the plurality of market conditions, wherein each visualization of the revenue determined for the plurality of market conditions includes a visual representation of the revenue associated with operating the power plant in each of the plurality of operating segments based on the respective range of operating values and power output and efficiency values that are attained with the operating values;
presenting for display, with the processor, one or more of the plurality of visualizations of the revenue associated with each of the operating segments in the partitioned flexible base load map for each of the plurality of market conditions; and wherein the power plant controller is configured to adjust the operation of the power plant in response to the obtaining of the flexible base load map, the partitioning of the flexible base load map into the plurality of operating segments, the determining of the revenue for each of the plurality of operating segments, and the presenting of the one or more of the plurality of visualizations of the revenue associated with each of the operating segments, wherein the adjusting of the operation of the power plant includes automatically adjusting at least one of the firing temperature, a Mach number, and/or fuel temperature of the at least one gas turbine.

13. The system of claim 12, wherein the presenting for display of the one or more of the plurality of visualizations of the revenue associated with each of the operating segments in the partitioned flexible base load map for each of the plurality of market conditions, comprises appending, with the processor, one or more user interactive slider scales configured to receive user-input for moving about each of the operating segments in the partitioned flexible base load map, and one or more input and output buttons for receiving user input data and displaying output data.

14. The system of claim 13, wherein movements of each of the one or more user interactive slider scales controls at least one of the plurality of operational parameters, wherein manipulation of each of the one or more user interactive slider scales shows a change in revenue that arises with an accompany change to the at least one of the plurality of operational parameters.

15. The system of claim 14, wherein the one or more user interactive slider scales comprises a first interactive slider scale configured to receive changes to the firing temperature and a second interactive slider scale configured to receive changes to the position of the inlet guide vanes in the at least one gas turbine, and the fuel temperature of the fuel in the at least one gas turbine.

16. The system of claim 15, wherein the first interactive slider scale and the second interactive slider scale are configured for movement towards an operating segment in the partitioned flexible base load map that provides maximum revenue.

17. The system of claim 15, wherein the one or more input and output buttons is configured to receive operating data associated with the operational parameters of the power plant and target power output and efficiency values.

18. The system of claim 17, further comprising modifying, with the processor, the plurality of visualizations of the revenue associated with each of the operating segments in the partitioned flexible base load map based on any data received by the one or more input and output buttons, and presenting, with the processor, a modified visualization.

19. The system of claim 18, wherein the first interactive slider scale and the second interactive slider scale are configured for movement about the modified visualization, wherein movement of one or more of the first interactive slider scale and the second interactive slider scale results in a display of an output value associated with the power plant on the one or more input and output buttons that results from the corresponding movement of the slider scales.

20. A non-transitory computer-readable medium having stored thereon executable instructions that, in response to execution, cause a power plant controller comprising at least one processor to perform operations directed to controlling operation of a power plant having at least one gas turbine, the operations comprising:
operating the power plant at an ambient condition and a load condition;
obtaining a flexible base load map for operating the power plant to meet base load power demands, wherein the flexible base load map includes a primary base load operating space for attaining target plant power output and efficiency, and an expanded base load portion for attaining higher plant power output and sub-optimal efficiency in relation to the primary base load operating space, both the primary base load operating space and the expanded base load portion including a representation that associates power output and efficiency values of the power plant that result from a subset of operational parameter values for operating the power plant during base load, the operational parameters including firing temperature of the at least one gas turbine, a position of inlet guide vanes in the at least one gas turbine, and fuel temperature of the fuel in the at least one gas turbine;
partitioning the flexible base load map into a plurality of operating segments, each operating segment including a range of operating values for the operational parameters and corresponding power output and efficiency values that are attained while operating the power plant at the range of operating values in the operating segment;
for each of the plurality of operating segments, determining revenue that is generated from operating the power plant over the range of operating values that attain the corresponding power output and efficiency values taking into consideration at least one of a plurality of market conditions associated with a power generation market;
generating a plurality of visualizations of the revenue associated with each of the operating segments in the partitioned flexible base load map for each of the plurality of market conditions, wherein each visualization of the revenue determined for the plurality of market conditions includes a visual representation of the revenue associated with operating the power plant in each of the plurality of operating segments based on the respective range of operating values and power output and efficiency values that are attained with the operating values;
presenting for display one or more of the plurality of visualizations of the revenue associated with each of the operating segments in the partitioned flexible base load map for each of the plurality of market conditions; and
adjusting the operation of the power plant in response to the obtaining of the flexible base load map, the partitioning of the flexible base load map into the plurality of operating segments, the determining of the revenue for each of the plurality of operating segments, and the presenting of the one or more of the plurality of visualizations of the revenue associated with each of the operating segments, wherein the adjusting of the operation of the power plant includes automatically adjusting at least one of the firing temperature, a Mach number, and/or fuel temperature of the at least one gas turbine.

* * * * *